United States Patent
Milanfar et al.

(10) Patent No.: US 7,477,802 B2
(45) Date of Patent: Jan. 13, 2009

(54) ROBUST RECONSTRUCTION OF HIGH RESOLUTION GRAYSCALE IMAGES FROM A SEQUENCE OF LOW RESOLUTION FRAMES

(75) Inventors: Peyman Milanfar, Menlo Park, CA (US); Sina Farsiu, Santa Cruz, CA (US); Michael Elad, Haifa (IL); Michael D. Robinson, Menlo Park, CA (US)

(73) Assignee: The Regents of the University of California, Santa Cruz, Oakland, CA (US)

( * ) Notice: Subject to any disclaimer, the term of this patent is extended or adjusted under 35 U.S.C. 154(b) by 22 days.

(21) Appl. No.: 11/601,518

(22) Filed: Nov. 16, 2006

(65) Prior Publication Data

US 2007/0217713 A1 Sep. 20, 2007

(51) Int. Cl.
*G06K 9/32* (2006.01)
(52) U.S. Cl. .................. 382/299; 382/266; 382/274; 382/275; 358/1.2; 358/3.26; 358/3.27
(58) Field of Classification Search .............. 382/255, 382/266, 269, 299; 358/1.2, 3.27
See application file for complete search history.

(56) References Cited

U.S. PATENT DOCUMENTS

| | | | | |
|---|---|---|---|---|
| 5,995,457 A * | 11/1999 | Jamail | ............ | 369/30.04 |
| 6,021,256 A * | 2/2000 | Ng et al. | ............ | 358/1.9 |
| 6,304,682 B1 * | 10/2001 | Patti | ............ | 382/299 |
| 6,381,279 B1 * | 4/2002 | Taubman | ............ | 375/240.18 |
| 6,434,280 B1 * | 8/2002 | Peleg et al. | ............ | 382/299 |
| 6,470,097 B1 * | 10/2002 | Lai et al. | ............ | 382/255 |
| 6,542,925 B2 * | 4/2003 | Brown et al. | ............ | 709/208 |
| 6,766,067 B2 * | 7/2004 | Freeman et al. | ............ | 382/299 |
| 7,085,323 B2 * | 8/2006 | Hong | ............ | 375/240.25 |
| 7,154,420 B2 * | 12/2006 | Deoka et al. | ............ | 341/63 |

OTHER PUBLICATIONS

Zomet et al. "Robust Super-Resolution" School of Computer Science and Engineering, The Hebrew University of Jerusalem.
Chan et al. "The Digital TV Filter and Nonlinear Denoising" (2001) IEEE Transaction on Image Processing vol. 10, No. 2 pp. 231-241.

(Continued)

*Primary Examiner*—Yosef Kassa
(74) *Attorney, Agent, or Firm*—Lumen Patent Firm

(57) ABSTRACT

A computer method of creating a super-resolved grayscale image from lower-resolution images using an $L_1$ norm data fidelity penalty term to enforce similarities between low and a high-resolution image estimates is provided. A spatial penalty term encourages sharp edges in the high-resolution image, the data fidelity penalty term is applied to space invariant point spread function, translational, affine, projective and dense motion models including fusing the lower-resolution images, to estimate a blurred higher-resolution image and then a deblurred image. The data fidelity penalty term uses the $L_1$ norm in a likelihood fidelity term for motion estimation errors. The spatial penalty term uses bilateral-TV regularization with an image having horizontal and vertical pixel-shift terms, and a scalar weight between 0 and 1. The penalty terms create an overall cost function having steepest descent optimization applied for minimization. Direct image operator effects replace matrices for speed and efficiency.

10 Claims, 27 Drawing Sheets

OTHER PUBLICATIONS

Elad, Michael "On the Orgin of the Bilateral Filter and Ways to Improve It" (2002) IEEE Transactions on Image Processing vol. 11 No. 10 pp. 1141-1151.

Elad et al. "Restoration of a Single Superresoution Image From Several Blurred, Noisy and Undersampled Measured images" (1997) IEEE Transactions on Images Processing vol. 6 No. 12 pp. 1646-1658.

Elad et al. "A Fast Super-Resolution Reconstruction Algorithm for Pure Translational Motion and Common Space-Invariant Blur" (2001) IEEE Transaction on Image Processing vol. 10 No. 8 pp. 1187-1193.

Li et al. "A Computational Algorithm for Minimizing Total Variation in Image Restoration" (1996) IEEE Transactions on Image Processing vol. XX, No. Y pp. 1-13.

* cited by examiner (a)

(b)

(c)

(d)

(e)

(f)

(a)

(b)

(c)

(d)

(e)

(f)

(a)

(b)

(c)

(d)

(a)

(b)

(a)

(b)

(a)

(b)

(c)

(d)

(e)

(f)

(g)

(h)

(i)

(a)

(b)

(c)

(d)

(a)

(b)

(c)

(d)

(a)

(b)

(c)

(d)

(e)

(f)

(g)

(h)

(i)

(j)

ROBUST RECONSTRUCTION OF HIGH RESOLUTION GRAYSCALE IMAGES FROM A SEQUENCE OF LOW RESOLUTION FRAMES

STATEMENT REGARDING FEDERALLY SPONSORED RESEARCH OR DEVELOPMENT

The present invention was supported in part by grant number CCR-9984246 from the National Science Foundation and grant number F49620-03-01-0387 from the U.S. Air Force. The U.S. Government has certain rights in the invention.

CROSS-REFERENCE TO RELATED APPLICATIONS

This application is cross-referenced to and claims the benefit from U.S. patent application Ser. No. 11/302,073 filed Dec. 12, 2005, which claims benefit of U.S. Provisional Application No. 60/637,282 filed Dec. 16, 2004, and which are hereby incorporated by reference.

FIELD OF THE INVENTION

This invention relates generally to high resolution image restoration and reconstruction. More particularly, it relates to a method for computing a high resolution grayscale image from a sequence of low-resolution images.

BACKGROUND

Super-resolution image reconstruction is a form of digital image processing that increases the resolvable detail in images. The earliest techniques for super-resolution generated a still image of a scene from a collection of similar lower-resolution images of the same scene. For example, several frames of low-resolution video may be combined using super-resolution techniques to produce a single still image whose resolution is significantly higher than that of any single frame of the original video. Because each low-resolution frame is slightly different and contributes some unique information that is absent from the other frames, the reconstructed still image has more information, i.e., higher resolution, than that of any one of the originals alone. Super-resolution techniques have many applications in diverse areas such as medical imaging, remote sensing, surveillance, still photography, and motion pictures.

The details of how to reconstruct the best high-resolution image from multiple low-resolution images is a complicated problem that has been an active topic of research for many years, and many different techniques have been proposed. One reason the super-resolution reconstruction problem is so challenging is because the reconstruction process is, in mathematical terms, an under-constrained inverse problem. In the mathematical formulation of the problem, the known low-resolution images are represented as resulting from a transformation of the unknown high-resolution image by effects of image warping due to motion, optical blurring, sampling, and noise. When the model is inverted, the original set of low-resolution images does not, in general, determine a single high-resolution image as a unique solution. Moreover, in cases where a unique solution is determined, it is not stable, i.e., small noise perturbations in the images can result in large differences in the super-resolved image. To address these problems, super-resolution techniques require the introduction of additional assumptions (e.g., assumptions about the nature of the noise, blur, or spatial movement present in the original images). Part of the challenge rests in selecting constraints that sufficiently restrict the solution space without an unacceptable increase in the computational complexity. Another challenge is to select constraints that properly restrict the solution space to good high-resolution images for a wide variety of input image data. For example, constraints that are selected to produce optimal results for a restricted class of image data (e.g., images limited to pure translational movement between frames and common space-invariant blur) may produce significantly degraded results for images that deviate even slightly from the restricted class.

The multiframe super-resolution problem was first addressed by a proposed frequency domain approach. Although the frequency domain methods are intuitively simple and computationally cheap, they are extremely sensitive to model errors, limiting their use. Also, by definition, only pure translational motion can be treated with such tools and even small deviations from translational motion significantly degrade performance.

Another popular class of methods solves the problem of resolution enhancement in the spatial domain. Non-iterative spatial domain data fusion approaches have been proposed, and an iterative back-projection method was previously developed. Additionally, a method based on the multichannel sampling theorem has been suggested. Further, a hybrid method, combining the simplicity of maximum likelihood (ML) with proper prior information was suggested.

The spatial domain methods known in the art are generally computationally expensive. A block circulant preconditioner for solving the Tikhonov regularized super-resolution problem has been introduced and formulated, and addressed the calculation of regularization factor for the under-determined case by generalized cross validation. Later, a very fast super-resolution algorithm for pure translational motion and common space invariant blur was developed. Another fast spatial domain method was recently suggested, where LR images are registered with respect to a reference frame defining a non-uniformly spaced high-resolution (HR) grid. Then, an interpolation method called Delaunay triangulation is used for creating a noisy and blurred HR image, which is subsequently deblurred. All of the above methods assumed the additive Gaussian noise model. Furthermore, regularization was either not implemented or it was limited to Tikhonov regularization. Considering outliers, a very successful robust super-resolution method has been described, but lacks the proper mathematical justification. Finally, quantization of noise resulting from video compression and proposed iterative methods have been considered to reduce compression noise effects in the super-resolved outcome.

What is needed is a super-resolution technique that is computationally efficient and produces desired improvements in image quality that are robust to variations in the properties of input image data.

SUMMARY OF THE INVENTION

The current invention provides a fast and robust super-resolution method of using an $L_1$ norm, both for the regularization and the data fusion terms. Whereas the former is responsible for edge preservation, the latter seeks robustness with respect to motion error, blur, outliers, and other kinds of errors not explicitly modeled in the fused images. The current invention method's performance is superior to what has been proposed earlier, and has fast convergence.

One aspect of the current invention provides a method of creating a super-resolved grayscale image from a plurality of lower-resolution images by using a data fidelity penalty term that is a data fidelity penalty term, that is an $L_1$ norm penalty term, to enforce similarities between low-resolution data and a high-resolution image estimate. Further the current invention uses a spatial penalty term that is a penalty term to encourage sharp edges in the high-resolution image.

This data fidelity penalty term is applied to space invariant point spread function, translational, affine, projective and dense motion models, where using the data fidelity penalty term includes fusing the lower-resolution images to estimate a blurred higher-resolution image, and estimating a deblurred image from said blurred higher-resolution image. The blurred higher-resolution image is a weighted mean of all measurements of a given pixel after zero filling and motion compensation.

Further, the data fidelity penalty term uses motion estimation errors including the $L_1$ norm in a likelihood fidelity term.

Additionally, the spatial penalty term uses bilateral-TV regularization. This bilateral-TV regularization includes an image having a horizontal pixel-shift term, a vertical pixel-shift term, and a scalar weight between 0 and 1.

By combining the data fidelity penalty term and the spatial penalty term, an overall cost function is created. This overall cost function has a steepest descent optimization that is applied to the overall cost function for minimization.

The current invention uses direct image operator effects including blur, high-pass filtering, masking, down-sampling, and shift that are implemented in place of matrices for process speed and memory efficiency.

In the current invention, lower-resolution images include compressed images and uncompressed images.

Finally, all of these aspects are a computer implemented method.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Figure 1:
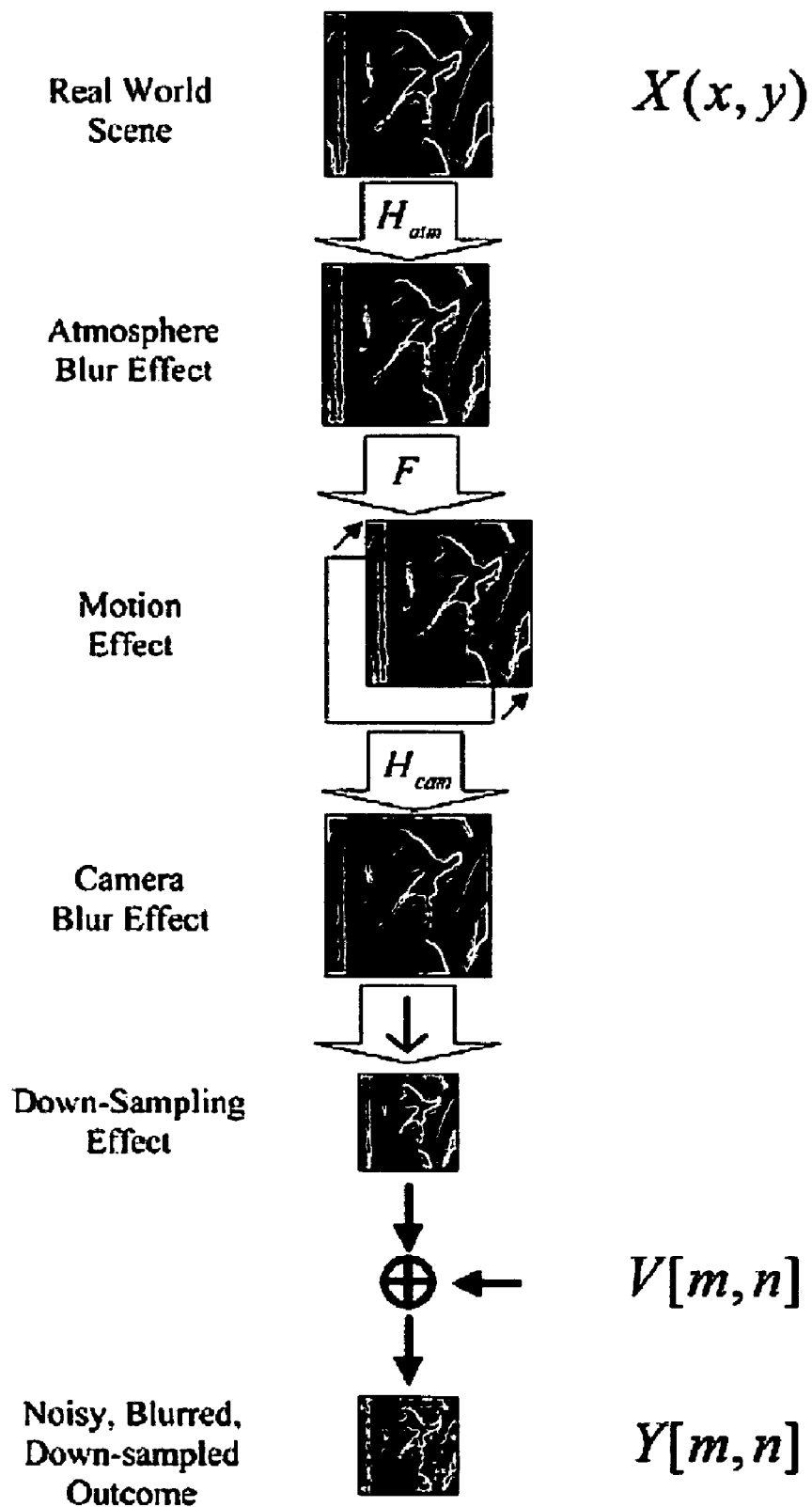
FIG. 1 shows a block diagram representation of a forward model low-resolution image outcome.

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

The detailed description presents a mathematical justification of a data fusion algorithm that explains its superior performance. In such, a computer implemented method is presented of creating a super-resolved grayscale image from a plurality of lower-resolution images by using a data fidelity penalty term that is an $L_1$ norm penalty term, to enforce similarities between low-resolution data and a high-resolution image estimate, where lower-resolution images include compressed images and uncompressed images. This method includes a spatial penalty term that is a penalty term to encourage sharp edges in the high-resolution image. Further, the data fidelity penalty term is applied to space invariant point spread function, translational, affine, projective and dense motion models, where using the data fidelity penalty term includes fusing the lower-resolution images to estimate a blurred higher-resolution image, and estimating a deblurred image from said blurred higher-resolution image. The blurred higher-resolution image is a weighted mean of all measurements of a given pixel after zero filling and motion compensation. The data fidelity penalty term uses motion estimation errors including the $L_1$ norm in a likelihood fidelity term. Additionally, the spatial penalty term uses bilateral-TV regularization. This bilateral-TV regularization includes an image having a horizontal pixel-shift term, a vertical pixel-shift term, and a scalar weight between 0 and 1. By combining the data fidelity penalty term and the spatial penalty term, an overall cost function is created. This overall cost function has a steepest descent optimization that is applied to the overall cost function for minimization. Direct image operator effects are used including blur, high-pass filtering, masking, down-sampling, and shift that are implemented in place of matrices for process speed and memory efficiency. All of these aspects of the current invention will be made clear in the following discussion.

Theoretical and practical limitations usually constrain the achievable resolution of any imaging device. A dynamic scene with continuous intensity distribution $X(x, y)$ is seen to be warped at the camera lens because of the relative motion between the scene and camera. The images are blurred both by atmospheric turbulence and camera lens by continuous point spread functions $H_{atm}(x, y)$ and $H_{cam}(x, y)$. Then, they will be discretized at the CCD resulting in a digitized noisy frame $Y[m, n]$. This forward model is represented by the following:

$$Y[m, n] = [H_{cam}(x, y)  F(H_{atm}(x, y)  X(x, y))] \downarrow + V[m, n]$$

in which  is the two-dimensional convolution operator, F is the warping operator, $\downarrow$ is the discretizing operator, $V[m, n]$ is the system noise, and is the resulting discrete noisy and blurred image. FIG. 1 illustrates this equation which depicts a block diagram representation of $$Y[m, n] = [H_{cam}(x, y)  F(H_{atm}(x, y) ** X(x, y))] \downarrow + V[m, n],$$

where $X(x, y)$ is the continuous intensity distribution of the scene, $V[m, n]$ is the additive noise, and $Y[m, n]$ is the resulting discrete low-quality image.

Super resolution is the process of combining a sequence of low-resolution (LR) noisy blurred images to produce a higher resolution (HR) image or sequence. The multiframe super-resolution problem was first addressed by a proposed frequency domain approach. Although the frequency domain methods are intuitively simple and computationally cheap, they are extremely sensitive to model errors, limiting their use. Also, by definition, only pure translational motion can be treated with such tools and even small deviations from translational motion significantly degrade performance.

Another popular class of methods solves the problem of resolution enhancement in the spatial domain. Non-iterative spatial domain data fusion approaches have been proposed, and an iterative back-projection method was previously developed. Additionally, a method based on the multichannel sampling theorem has been suggested. Further, a hybrid method, combining the simplicity of maximum likelihood (ML) with proper prior information was suggested.

The spatial domain methods discussed so far are generally computationally expensive. A block circulant preconditioner for solving the Tikhonov regularized super-resolution problem has been introduced and formulated, and addressed the calculation of regularization factor for the under-determined case by generalized cross validation. Later, a very fast super-resolution algorithm for pure translational motion and common space invariant blur was developed. Another fast spatial domain method was recently suggested, where LR images are registered with respect to a reference frame defining a non-uniformly spaced HR grid. Then, an interpolation method called Delaunay triangulation is used for creating a noisy and blurred HR image, which is subsequently deblurred. All of the above methods assumed the additive Gaussian noise model. Furthermore, regularization was either not implemented or it was limited to Tikhonov regularization. Considering outliers, a very successful robust super-resolution method has been described, but lacks the proper mathematical justification. Finally, quantization of noise resulting from video compression and proposed iterative methods have been considered to reduce compression noise effects in the super-resolved outcome.

The two most common matrix notations used to formulate the general super-resolution model of $$Y[m, n] = [H_{cam}(x, y) F(H_{atm}(x, y) X(x, y))] \downarrow + V[m, n]$$

represent the problem in the pixel domain. A more popular notation considers only camera lens blur and is defined as $$Y_k = D_k H_k^{cam} F_k X + V_k \quad k=1, \ldots, N$$

where the $[r^2 M^2 \times r^2 M^2]$ matrix is the geometric motion operator between the HR frame X (of size $[r^2 M^2 \times 1]$) and the $k^{th}$ LR frame (of size $[M^2 \times 1]$) which are rearranged in lexicographic order and r is the resolution enhancement factor. The camera's point spread function (PSF) is modeled by the $[r^2 M^2 \times r^2 M^2]$ blur matrix $H_k^{cam}$, and $[M^2 \times r^2 M^2]$ matrix $D_k$ represents the decimation operator. The vector $V_k$ is the system noise N and is the number of available LR frames.

Considering only atmosphere and motion blur, an alternate matrix formulation was recently presented of $$Y[m, n] = [H_{cam}(x, y) F(H_{atm}(x, y) X(x, y))] \downarrow + V[m, n]$$

as $$Y_k = D_k F_k H_k^{atm} X + V_k \quad k=1, \ldots, N$$

In conventional imaging systems (such as video cameras), camera lens blur has a more important effect than the atmospheric blur (which is very important for astronomical images). In this description, $$Y_k = D_k H_k^{cam} F_k X + V_k \quad k=1, \ldots, N$$

is used. Note that, under some assumptions discussed below, blur and motion matrices commute and the general matrix super-resolution formulation from $$Y[m, n] = [H_{cam}(x, y) F(H_{atm}(x, y) X(x, y))] \downarrow + V[m, n]$$

can be rewritten as $$\underline{Y}_k = D_k H_k^{cam} F_k H_k^{atm} \underline{X} + \underline{V}_k$$
$$= D_k H_k^{cam} H_k^{atm} F_k \underline{X} + \underline{V}_k \quad k = 1, \ldots, N.$$

Defining merges both models into a form similar to $$Y_k = D_k H_k^{cam} F_k X + V_k \quad k=1, \ldots, N$$

The current invention presents a fast and robust super-resolution algorithm using the $L_1$ norm, both for the regularization and the data fusion terms. Whereas the former is responsible for edge preservation, the latter seeks robustness with respect to motion error, blur, outliers, and other kinds of errors not explicitly modeled in the fused images. The current invention's method performance is superior to what has been proposed earlier, and has fast convergence.

Estimation of an unknown HR image is not exclusively based on the LR measurements. It is also based on many assumptions such as noise or motion models. These models are not supposed to be exactly true, as they are merely mathematically convenient formulations of some general prior information.

From many available estimators, which estimate a HR image from a set of noisy LR images, one may choose an estimation method which promises the optimal estimation of the HR frame, based on certain assumptions on data and noise models. When the fundamental assumptions of data and noise models do not faithfully describe the measured data, the estimator performance degrades. Furthermore, existence of outliers, which are defined as data points with different distributional characteristics than the assumed model, will produce erroneous estimates. A method which promises optimality for a limited class of data and noise models may not be the most effective overall approach. Often, suboptimal estimation methods which are not as sensitive to modeling and data errors may produce better and more stable results (robustness).

To study the effect of outliers, the concept of a breakdown point has been used to measure the robustness of an algorithm. The breakdown point is the smallest percentage of outlier contamination that may force the value of the estimate outside some range. For instance, the breakdown point of the simple mean estimator is zero, meaning that one single outlier is sufficient to move the estimate outside any predicted bound. A robust estimator, such as the median estimator, may achieve a breakdown equal to 0.5, which is the highest value for breakdown points. This suggests that median estimation may not be affected by data sets in which outlier contaminated measurements form less that 50% of all data points.

A popular family of estimators are the ML-type estimators (ML estimators). Rewriting the definition of these estimators in the super resolution context gives the following minimization problem:

$$\hat{X} = \underset{X}{\text{ArgMin}} \left[ \sum_{k=1}^{N} \rho(\underline{Y}_k, D_k H_k F_k \underline{X}) \right]$$

or by an implicit equation $$\sum_{k} \Psi(\underline{Y}_k, D_k H_k F_k \underline{X}) = 0$$

where $\rho$ is measuring the "distance" between the model and measurements and $\Psi(Y_k, D_k H_k F_k X) = (\partial/\partial X)\rho(Y_k, D_k H_k F_k X)$. The ML estimate of X for an assumed underlying family of exponential densities $f(Y_k, D_k H_k F_k X)$ can be achieved when $\Psi(Y_k, D_k H_k F_k X) = -\log f(Y_k, D_k H_k F_k X)$ To find the ML estimate of the HR image, many approaches adopt a data model such as $Y_k = D_k H_k^{cam} F_k X + V_k$ k=1, ..., N and model $V_k$ (additive noise) as white Gaussian noise. With this noise model, least-squares approach will result in the ML estimate. The least-squares formulation is achieved when is the norm of residual $$\hat{X} = \underset{X}{\text{ArgMin}} \left[ \sum_{k=1}^{N} \| D_k H_k F_k X - \underline{Y}_k \|_2^2 \right]$$

For the special case of super resolution, it will be shown below that least-squares estimation has the interpretation of being a nonrobust mean estimation. As a result, least squares-based estimation of a HR image, from a data set contaminated with non-Gaussian outliers, produces an image with visually apparent errors.

To appreciate this claim and study of the visual effects of different sources of outliers in a video sequence, the following experiments are provided. In these experiments, four LR images were used to reconstruct a higher resolution image with two times more pixels in vertical and horizontal directions [a resolution enhancement factor of two using the least-squares approach $$\hat{X} = \underset{X}{\text{ArgMin}} \left[ \sum_{k=1}^{N} \| D_k H_k F_k \underline{X} - \underline{Y}_k \|_2^2 \right].$$

Figure 2:
FIGS. 2a-2f show simulation results of outlier effects on super-resolved images.
Figure 2:
Figure 2:
Figure 2:
Figure 2:
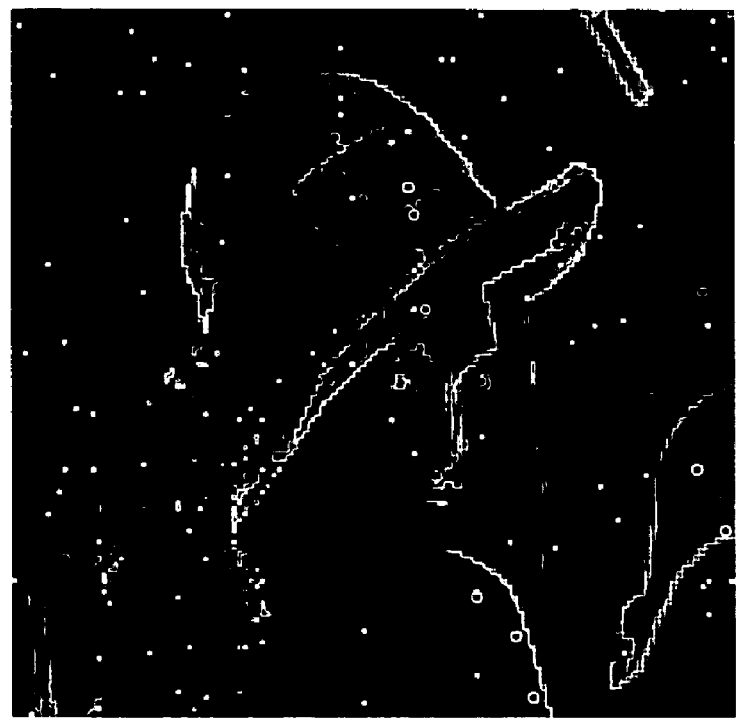
Figure 2:

FIG. 2 show simulation results of outlier effects on super-resolved images. Here, the original HR image in FIG. 2(a) was warped with translational motion and down sampled resulting in four images such as FIG. 2(b) that shows one of these LR images which has been acquired by shifting FIG. 2(a) in vertical and horizontal directions and subsampling it by factor of two (pixel replication is used to match its size with other pictures). FIG. 2(c) shows an image acquired with downsampling and zoom (affine motion). FIG. 2(d) shows reconstruction of these four LR images with least-squares approach. FIG. 2(e) shows one of four LR images acquired by adding salt and pepper noise to set of images in FIG. 2(b). FIG. 2(F) shows reconstruction of images in FIG. 2(e) with least-squares approach.

In the first experiment one of the four LR images contained affine motion with respect to the other LR images. If the model assumes translational motion, this results in a very common source of error when super resolution is applied to real data sequences, as the respective motion of camera and the scene are seldom pure translational. FIG. 2(c) shows this outlier image. FIG. 2(d) shows the effect of this error in the motion model (shadows around Lena's hat) when the non robust least-squares approach is used for reconstruction.

To study the effect of non-Gaussian noise models, in the second experiment all four LR images were contaminated with salt and pepper noise. FIG. 2(e) shows one of these LR images and FIG. 2(f) is the outcome of the least-squares approach for reconstruction.

As the outlier effects are visible in the output results of leastsquares-based super-resolution methods, it seems essential to find an alternative estimator. This new estimator should have the essential properties of robustness to outliers and fast implementation.

The shortcomings of least squares-based HR image reconstruction has now been discussed. The family of $L_p$, $1 \leq p \leq 2$ norm estimators is now discussed. Here the most robust estimator of this family is chosen and it is shown how implementation of this estimator requires minimum memory usage and is very fast. The following expression formulates the minimization criterion:

$$\hat{X} = \underset{X}{\text{ArgMin}} \left[ \sum_{k=1}^{N} \| D_k H_k F_k X - \underline{Y}_k \|_p^p \right]$$

Note that if p=2, then the above minimization criterion will be equal to the least-squares formulation $$\hat{X} = \underset{X}{\text{ArgMin}} \left[ \sum_{k=1}^{N} \| D_k H_k F_k X - \underline{Y}_k \|_2^2 \right].$$

Considering translational motion and with reasonable assumptions such as common space-invariant PSF, and similar decimation factor for all LR frames (i.e., $\forall k$ $H_k = H$ and $D_k = D$ which is true when all images are acquired with a unique camera), the gradient of the cost is calculated. It will be shown that $L_p$ norm minimization is equivalent to pixelwise weighted averaging of the registered frames. These weights are calculated for the special case of $L_1$ norm minimization and it is show that $L_1$ norm converges to median estimation which has the highest breakpoint value.

Since H and $F_k$ are block circulant matrices, they commute ($F_kH=HF_k$ and $F_k^TH^T=H^TF_k^T$). Therefore, $$\hat{X} = \underset{X}{\text{ArgMin}}\left[\sum_{k=1}^{N}\|D_kH_kF_kX - Y_k\|_p^p\right]$$

may be rewritten as $$\hat{X} = \underset{X}{\text{ArgMin}}\left[\sum_{k=1}^{N}\|DF_kHX - Y_k\|_p^p\right].$$

Define $Z=HX$. So, $Z$ is the blurred version of the ideal HR image $X$. Thus, the minimization problem is broken in two separate steps:

1) finding a blurred HR image from the LR measurements (this result is called $\hat{Z}$);
2) estimating the deblurred image $\hat{X}$ from $\hat{Z}$.

Note that anything in the null space H of will not converge by the proposed scheme. However, if an initialization is chosen that has no gradient energy in the null space, this will not pose a problem. As it turns out, the null space of corresponds to very high frequencies, which are not part of the desired solution. Note that addition of an appropriate regularization term (discussed below) will result in a well-posed problem with an empty null space. To find $\hat{Z}$, $HX$ is substituted with $Z$ $$\hat{Z} = \underset{Z}{\text{ArgMin}}\left[\sum_{k=1}^{N}\|DF_kZ - Y_k\|_p^p\right]$$

The gradient of the cost in $\hat{Z}$ above is $$G_p = \frac{\partial}{\partial Z}\left[\sum_{k=1}^{N}\|DF_kZ - Y_k\|_p^p\right]$$
$$= \sum_{k=1}^{N} F_k^T D^T \text{sign}(DF_kZ - Y_k) \odot |DF_kZ - Y_k|^{p-1}$$

where operator $\odot$ is the element-by-element product of two vectors.

The vector $\hat{Z}$ which minimizes the criterion $$\hat{Z} = \underset{Z}{\text{ArgMin}}\left[\sum_{k=1}^{N}\|DF_kZ - Y_k\|_p^p\right]$$

will be the solution to $G_p=0$. There is a simple interpretation for the solution: The vector $\hat{Z}$ is the weighted mean of all measurements at a given pixel, after proper zero filling and motion compensation.

To appreciate this fact, consider two boundary values of p. If p=2, then $$G_2 = \sum_{k=1}^{N} F_k^T D^T (DF_k\hat{Z}_n - Y_k) = 0$$

which has been previously proved to be the pixelwise average of measurements after image registration. If p=1 then the gradient term will be $$G_1 = \sum_{k=1}^{N} F_k^T D^T \text{sign}(DF_k\hat{Z} - Y_k) = 0.$$

Figure 3:
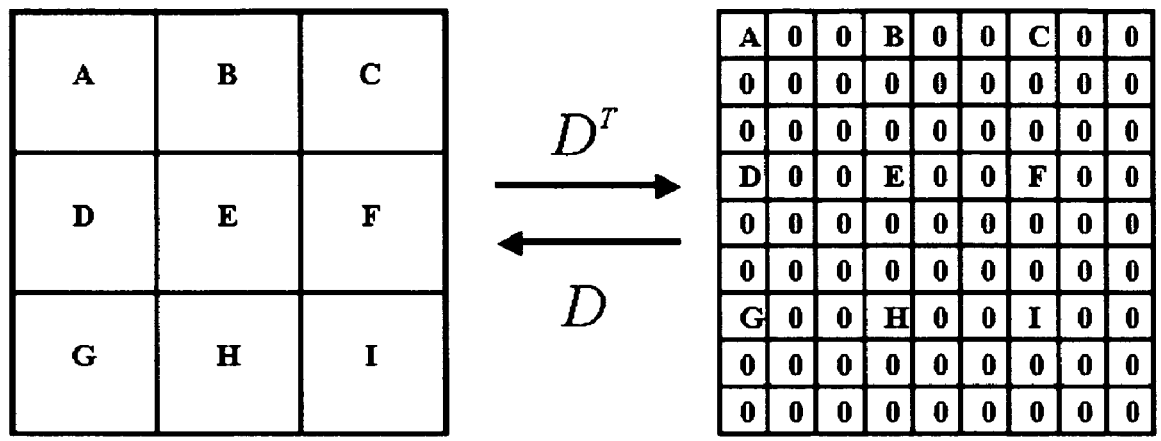
FIG. 3 shows the effects of upsampling.

Note that $F_k^TD^T$ copies the values from the LR grid to the HR grid after proper shifting and zero filling, and $DF_k$ copies a selected set of pixels in the HR grid back on the LR grid. FIG. 3 illustrates the effect of upsampling $D^T$ matrix on a 3×3 image and downsampling matrix D on the corresponding 9×9 upsampled image (resolution enhancement factor of three). In this figure, to give a better intuition, the image vectors are reshaped as matrices. Neither of these two operations changes the pixel values. Therefore, each element of $G_1$, which corresponds to one element in $\hat{Z}$, is the aggregate of the effects of all LR frames. The effect of each frame has one of the following three forms:

1) addition of zero, which results from zero filling;
2) addition of +1, which means a pixel in $\hat{Z}$ was larger than the corresponding contributing pixel from frame $Y_k$;
3) addition of −1, which means a pixel in $\hat{Z}$ was smaller than the corresponding contributing pixel from frame $Y_k$.

A zero gradient state ($G_1=0$) will be the result of adding an equal number of −1 and +1, which means each element $\hat{Z}$ of should be the median value of corresponding elements in the LR frames. $\hat{X}$, the final super-resolved picture, is calculated by deblurring $\hat{Z}$.

So far, it has been shown that p=1 results in pixelwise median and p=2 results in pixelwise mean of all measurements after motion compensation. According to $$G_p = \frac{\partial}{\partial Z}\left[\sum_{k=1}^{N}\|DF_kZ - Y_k\|_p^p\right]$$
$$= \sum_{k=1}^{N} F_k^T D^T \text{sign}(DF_kZ - Y_k) \odot |DF_kZ - Y_k|^{p-1},$$

1<p<2, then both sign($DF_k Z_n - Y_k$) and $|DF_k Z_n - Y_k|^{p-1}$ terms appear in $G_p$. Therefore, when the value of p is near one, $\hat{Z}$ is a weighted mean of measurements, with much larger weights around the measurements near the median value, while when the value of p is near two the weights will be distributed more uniformly.

The $L_p$, $1 \leq p \leq 2$ norm minimization family has been described. As p→1, this estimator takes the shape of median estimator, which has the highest breakpoint value, making it the most robust cost function. From here forward, the measurement error is minimized.

In the square or under-determined cases ($N=r^2$ and $N<r^2$ respectively), there is only one measurement available for each HR pixel. As median and mean operators for one or two measurements give the same result, $L_1$ and $L_2$ norm minimizations will result in identical answers. Also, in the underdetermined cases, certain pixel locations will have no estimate at all. For these cases, it is essential for the estimator to have an extra term, called regularization term, to remove outliers. Regularization terms are discussed here and a robust and convenient regularization term is presented.

Super resolution is an ill-posed problem. For the underdetermined cases (i.e., when fewer than $r^2$ frames are available), there exist an infinite number of solutions which satisfy $Y_k = D_k H_k^{cam} F_k X + V_k k=1, \ldots, N$. The solution for square and over-determined cases is not stable, which means small amounts of noise in measurements will result in large perturbations in the final solution. Therefore, considering regularization in super-resolution algorithm as a means for picking a stable solution is very useful, if not necessary. Also, regularization can help the algorithm to remove artifacts from the final answer and improve the rate of convergence. Of the many possible regularization terms, one is desired which results in HR images with sharp edges and is easy to implement.

A regularization term compensates the missing measurement information with some general prior information about the desirable HR solution, and is usually implemented as a penalty factor in the generalized minimization cost function $$\hat{X} = \underset{X}{\mathrm{ArgMin}} \left[ \sum_{k=1}^{N} \rho(Y_k, D_k H_k F_k X) \right]$$

giving $$\hat{X} = \underset{X}{\mathrm{ArgMin}} \left[ \sum_{k=1}^{N} \rho(Y_k, D_k H_k F_k X) + \lambda \Upsilon(X) \right]$$

where $\lambda$, the regularization parameter, is a scalar for properly weighting the first term (similarity cost) against the second term (regularization cost) and $\Upsilon$ is the regularization cost function.

One of the most widely referenced regularization cost functions is the Tikhonov cost function, $$\Upsilon_T(X) = \|\Gamma X\|_2^2$$

where $\Gamma$ is usually a highpass operator such as derivative, Laplacian, or even identity matrix. The intuition behind this regularization method is to limit the total energy of the image (when $\Gamma$ is the identity matrix) or forcing spatial smoothness (for derivative or Laplacian choices of $\Gamma$). As the noisy and edge pixels both contain high-frequency energy, they will be removed in the regularization process and the resulting denoised image will not contain sharp edges.

Certain types of regularization cost functions work efficiently for some special types of images but are not suitable for general images (such as maximum entropy regularizations which produce sharp reconstructions of point objects, such as star fields in astronomical images).

One of the most successful regularization methods for denoising and deblurring is the total variation (TV) method. The TV criterion penalizes the total amount of change in the image as measured by the norm of the magnitude of the gradient and is defined as $$\Upsilon_{TV}(X) = \|\nabla X\|_1$$

where $\nabla$ is the gradient operator. The most useful property of TV criterion is that it tends to preserve edges in the reconstruction, as it does not severely penalize steep local gradients.

Based on the spirit of TV criterion, and a related technique called the bilateral filter (presented below), a robust regularizer called bilateral TV is introduced, which is computationally cheap to implement, and preserves edges. The regularizing function looks like $$\Upsilon_{BTV}(X) = \sum_{l,m=-P}^{P} \alpha^{|m|+|l|} \|\underline{X} - S_x^l S_y^m \underline{X}\|_1$$

where matrices (operators) $S_x^l$, and $S_y^k$ shift X by l, and k pixels in horizontal and vertical directions respectively, presenting several scales of derivatives. The scalar weight $\alpha$, $0 < \alpha \leq 1$, is applied to give a spatially decaying effect to the summation of the regularization terms.

The idea of the bilateral filter is known to be a very effective one-pass filter for denoising purposes while keeping sharp edges. Unlike conventional filters such as a Gaussian low-pass filter, the bilateral filter defines the closeness of two pixels not only based on geometric distance but also based on photometric distance. Considering one-dimensional (1-D) case (for simplifying the notations), the result of applying bilateral filter for the $k^{th}$ sample in the estimated 1-D signal $\hat{X}$ is $$\hat{X}[k] = \frac{\sum_{m=-M}^{M} W[k,m]Y[k-m]}{\sum_{m=-M}^{M} W[k,m]}$$

where $Y = X + V$ is the noisy image (vector), and $2 \times M + 1$ is the size of 1-D bilateral kernel. The weight $W[k, m] = W_S[k, m] W_P[k, m]$ considers both photometric and spatial difference of sample k in noisy vector Y from its neighbors to define the value of sample k in the estimated vector X. The spatial and photometric difference weights were arbitrarily defined as $$W_S[k,m] = \exp\left\{-\frac{m^2}{2\sigma_S^2}\right\}$$

$$W_P[k,m] = \exp\left\{-\frac{[Y[k]-Y[k-m]]^2}{2\sigma_R^2}\right\}$$

where parameters $\sigma_S^2$ and $\sigma_R^2$ control the strength of spatial and photometric property of the filter, respectively.

It has been proved with the Jacobi method, that such filter is a single iteration of the weighted least-squares minimization $$\hat{X} = \underset{X}{\mathrm{ArgMin}} \left[ \|\underline{X} - \underline{Y}\|_2^2 + \lambda \sum_{m=1}^{M} \|\underline{X} - S^m \underline{X}\|_{W_m}^2 \right]$$

-continued $$= \underset{X}{\text{ArgMin}}[\underline{X} - \underline{Y}]^T[\underline{X} - \underline{Y}] + \lambda \sum_{m=1}^{M}[\underline{X} - S^m\underline{X}]^T W_m[\underline{X} - S^m\underline{X}],$$

where $S^m$ implies a shift right of m samples. It has also been shown that using more iterations will enhance the performance of this filter.

Note that by defining the $(i, i)^{th}$ element of the diagonal weight matrix $W_m$ as $$W_m(i, i) = \frac{\alpha^m}{|X(i) - S^m X(i)|} \quad 0 < \alpha < 1$$

that is, weighting the estimate with respect to both photometric distance $|X(i)-S^m X(i)|$ and geometric distance $\alpha^m$, then the single iteration of the weighted least-squares minimization above will become $$\hat{X} = \underset{X}{\text{ArgMin}}\left[\|\underline{X} - \underline{Y}\|_2^2 + \lambda \sum_{m=1}^{M} \alpha^m \|\underline{X} - S^m\underline{X}\|_1\right]$$

which is the 1-D version of the bilateral TV criterion in $$\Upsilon_{BTV}(X) = \sum_{l,m=-P}^{P} \alpha^{|m|+|l|} \|\underline{X} - S_x^l S_y^m \underline{X}\|_1.$$

It is easy to show that this regularization method is a generalization of other popular regularization methods. Limiting to the two cases of m=1, and l=1, with α=1, and define operators $Q_x$ and $Q_y$ as representatives of the first derivative $(Q_x=I-S_x$ and $Q_y=I-S_y)$ then the regularization function above results in $$\Upsilon_{BTV}(X) = \|Q_x X\|_1 + \|Q_y X\|_1$$

which has been suggested to be a reliable and computationally efficient approximation to the TV prior.

Figure 4:
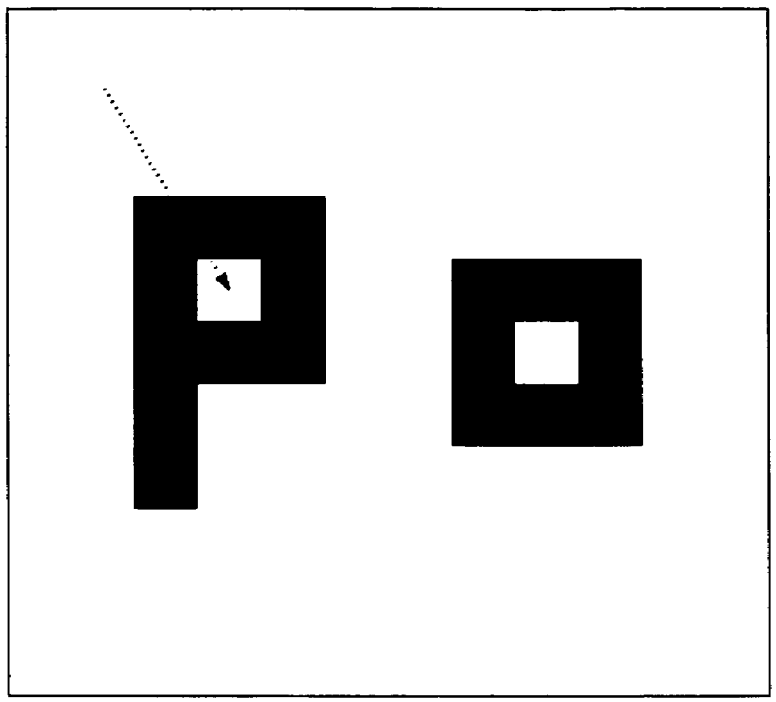
FIGS. 4a-4e show simulation results of denoising using different regularization methods.
FIG. 4f shows errors in gray-level value estimation versus the iteration number in Tikhonov, TV and Bilateral TV denoising.
Figure 4:
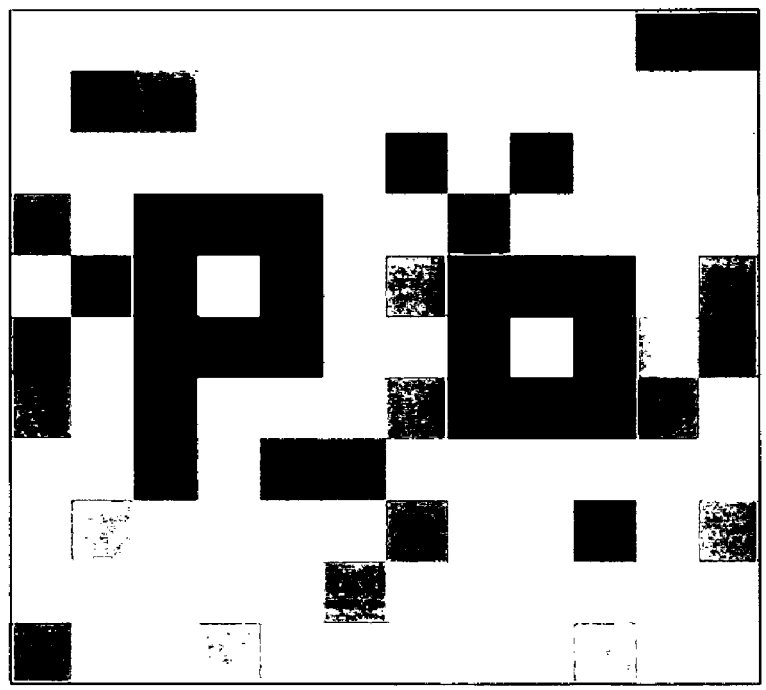
Figure 4:
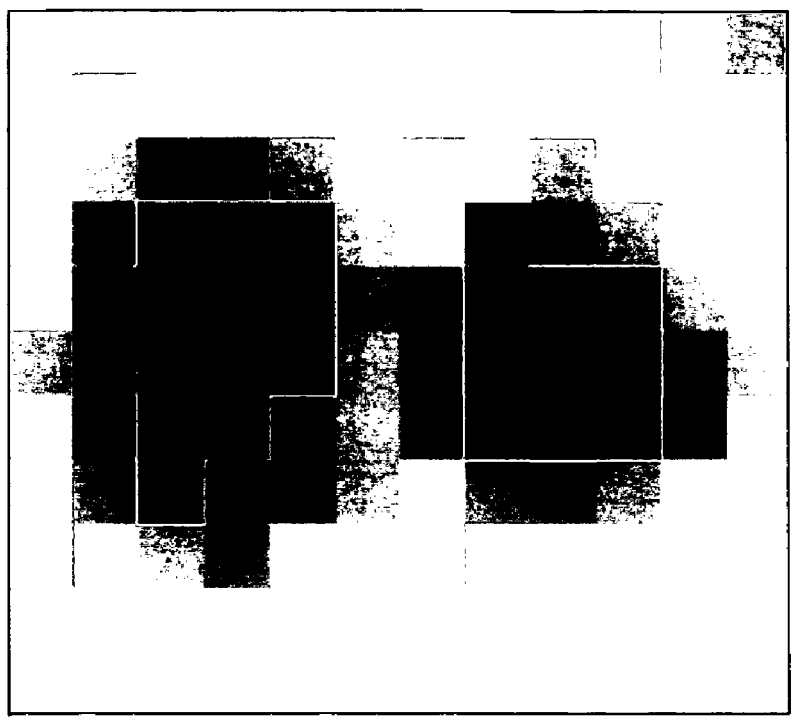
Figure 4:
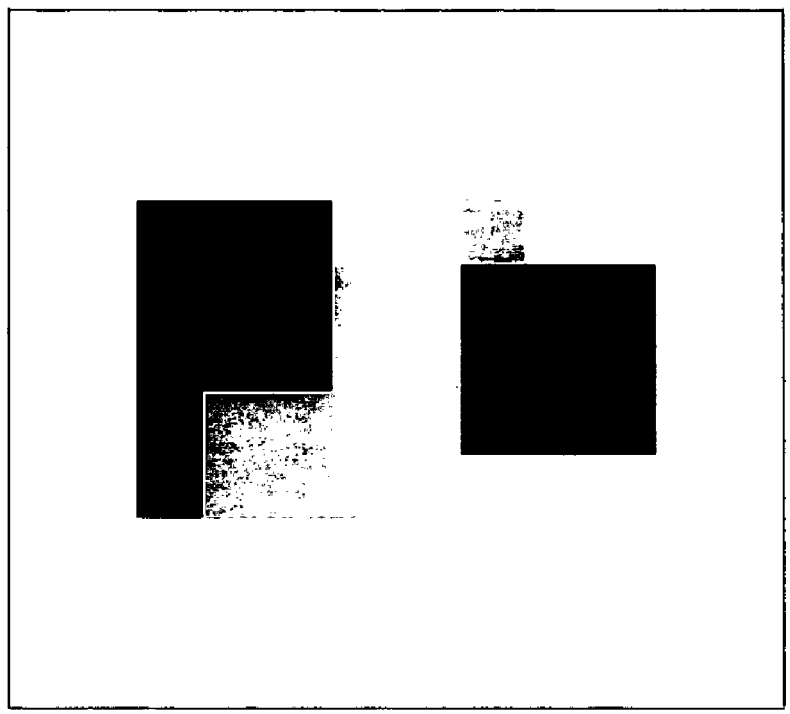
Figure 4:
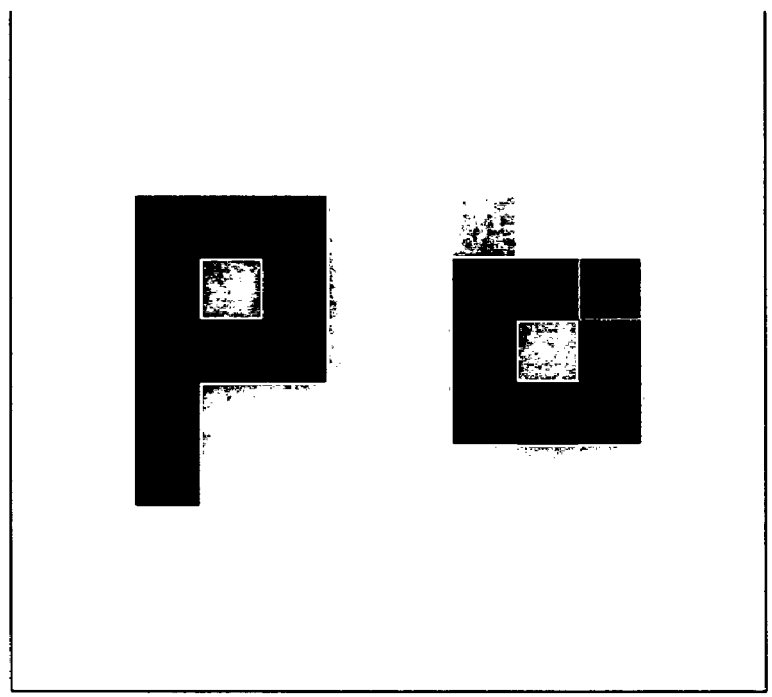
Figure 4:
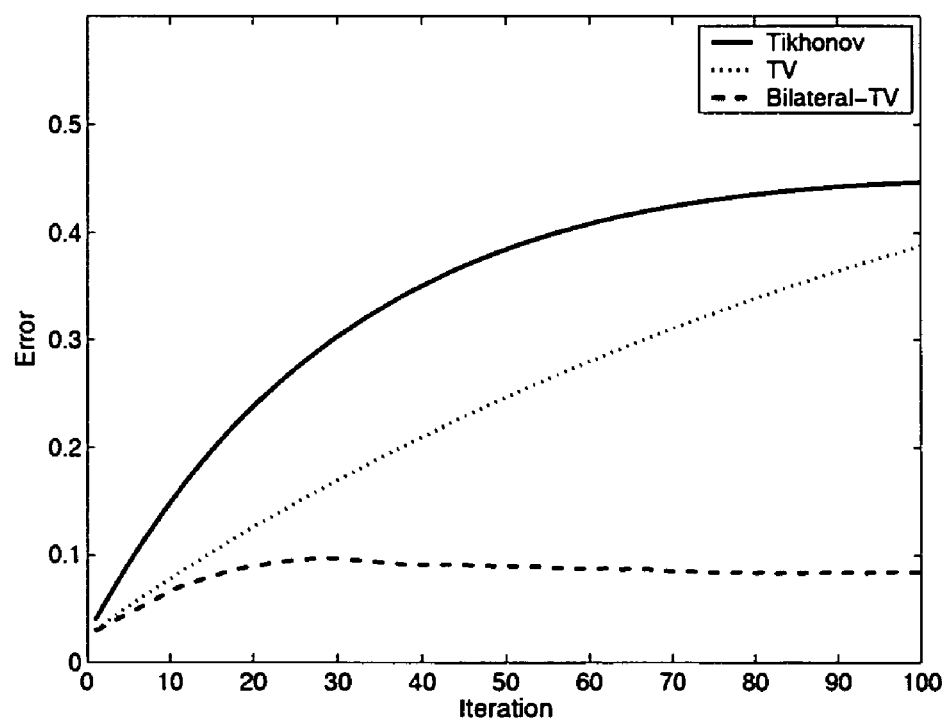

To compare the performance of bilateral TV (P≧1) to common TV prior (P=1), the following denoising experiment is provided. FIGS. 4(a)-4(e) illustrate simulation results of denoising using different regularization methods. FIG. 4(a) Original. FIG. 4(b) Noisy. FIG. 4(c) Reconstruction using Tikhonov. FIG. 4(d) Reconstruction using TV. FIG. 4(e) Reconstruction using bilateral TV. FIG. 4(f) Error in graylevel value estimation of the pixel indicated by arrow in FIG. 4(a) versus the iteration number in Tikhonov (solid line), TV (dotted line), and bilateral TV (broken line) denoising. Gaussian white noise of mean zero and variance 0.045 is added to the image in FIG. 4(a) resulting in the noisy image of FIG. 4(b).

If X and Y represent the original and corrupted images then following $$\hat{X} = \underset{X}{\text{ArgMin}}\left[\sum_{k=1}^{N} \rho(\underline{Y}_k, D_k H_k F_k \underline{X}) + \lambda \Upsilon(\underline{X})\right],$$

-continued minimizing $$\hat{X} = \underset{X}{\text{ArgMin}}[\|\underline{Y} - \underline{X}\|_2^2 + \lambda \Upsilon(\underline{X})]$$

to reconstruct the noisy image. Tikhonov denoising resulted in FIG. 4(c), where Γ in $$\Upsilon_T(X) = \|\Gamma X\|_2^2$$

was replaced by matrix realization of the Laplacian kernel $$\Gamma_{kernel} = \frac{1}{8}\begin{bmatrix} 1 & 1 & 1 \\ 1 & -8 & 1 \\ 1 & 1 & 1 \end{bmatrix}.$$

Although a relatively large regularization factor (λ=4.5) was chosen for this reconstruction which resulted in the loss of sharp edges, yet the noise has not been removed efficiently. The result of using TV prior (P=1, λ=0.009) for denoising is shown in FIG. 4(d). FIG. 4(e) shows the result of applying bilateral TV prior (P=3, λ=0.009). The criteria for parameter selection in this example (and other examples discussed later) was to choose parameters which produce visually most appealing results. Therefore, to ensure fairness, each experiment was repeated several times with different parameters and the best result of each experiment was chosen as the outcome of each method. FIG. 4(c) is an exception, where it is shown that Tikhonov regularization fails to effectively remove noise even with a very large regularization factor. Notice the effect of each reconstruction method on the pixel indicated by an arrow in FIG. 4(a). As this pixel is surrounded by nonsimilar pixels, TV prior considers it as a heavily noisy pixel and uses the value of immediate neighboring pixels to estimate its original value. On the other hand, bilateral TV considers a larger neighborhood. By bridging over immediate neighboring pixels, the value of similar pixels are also considered in graylevel estimation of this pixel, therefore the smoothing effect in FIG. 4(e) is much less than FIG. 4(d). FIG. 4(f) compares the performance of TV and bilateral TV denoising methods in estimating graylevel value of the arrow indicated pixel. Unlike bilateral TV regularization, increasing the number of iterations in Tikhonov and TV regularizations will result in more undesired smoothing. This example demonstrates the tendency of other regularization functionals to remove point-like details from the image. The proposed regularization not only produces sharp edges but also retains point-like details.

To compare the performance of our regularization method to the Tikhonov regularization method, another experiment is provided. An image is corrupted by blurring it with a Gaussian blur kernel followed by adding Gaussian additive noise. The image is reconstructed using Tikhonov and the regularization terms of the current invention (this scenario can be thought of as a super-resolution problem with resolution factor of one). If X and Y represent the original and corrupted images and H represents the matrix form of the blur kernel then following $$\hat{X} = \underset{X}{\text{ArgMin}} \left[ \sum_{k=1}^{N} \rho(\underline{Y}_k, D_k H_k F_k \underline{X}) + \lambda \Upsilon(\underline{X}) \right],$$

minimizing $$\hat{X} = \underset{X}{\text{ArgMin}} [\|\underline{Y} - H\underline{X}\|_2^2 + \lambda \Upsilon(\underline{X})]$$

to reconstruct the blurred noisy image.

Figure 5:
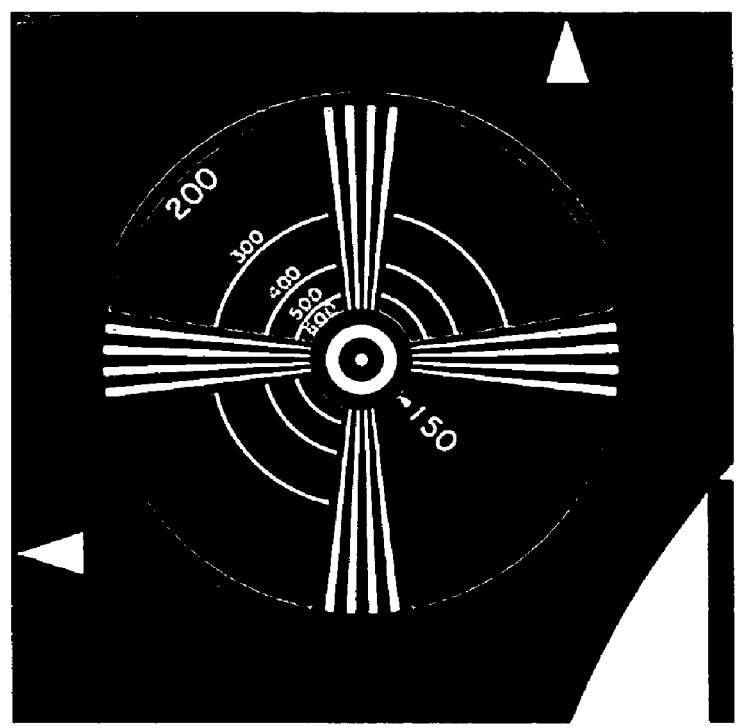
FIGS. 5a-5d show simulation results of deblurring using regularization methods.
Figure 5:
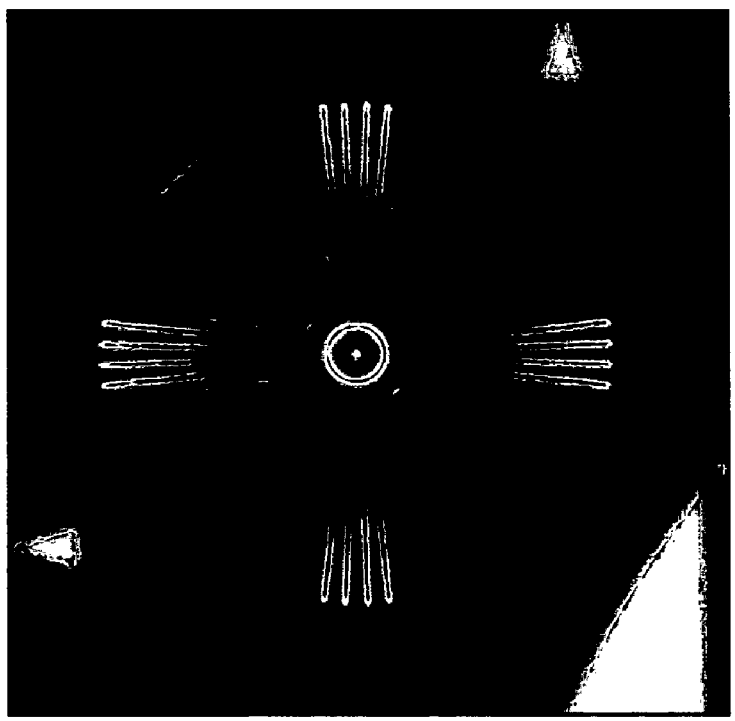
Figure 5:
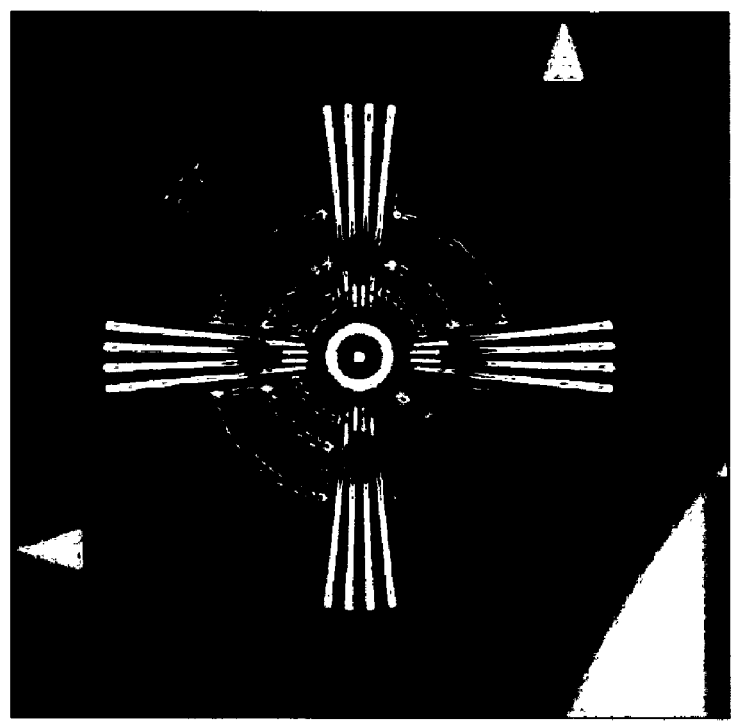
Figure 5:
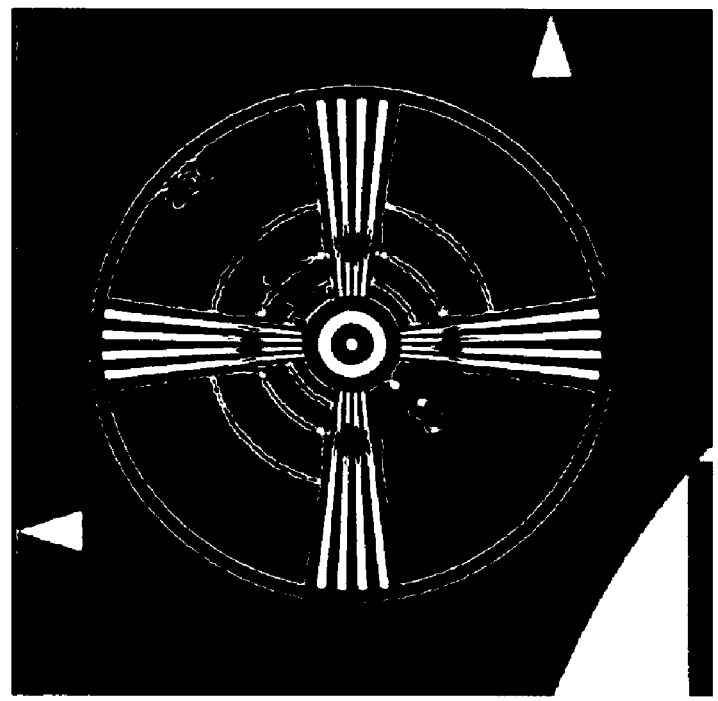

FIGS. 5(a)-5(d) show simulation results of deblurring using different regularization methods. FIG. 5(a) shows the original image (X). FIG. 5(b) is the corrupted Y=HX+V, where V is the additive noise. FIG. 5(c) is the result of reconstruction with Tikhonov regularization, where $\Gamma$ in $\Upsilon_T(X)=\|\Gamma X\|_2^2$ was replaced by the Laplacian kernel $$\Gamma_{kernel} = \frac{1}{8}\begin{bmatrix} 1 & 1 & 1 \\ 1 & -8 & 1 \\ 1 & 1 & 1 \end{bmatrix}$$

and $\lambda$=0.03. FIG. 5(d) shows the result of applying our regularization criterion $$\Upsilon\Upsilon_{BTV}(X) = \|Q_x X\|_1 + \|Q_y X\|_1$$

with the following parameters $\alpha$=0.7, $\lambda$=0.17 and P=2. The best mean-square error (MSE) achieved by Tikhonov regularization was 313 versus 215 for the regularization according to the current invention. The superior edge preserving property of the bilateral prior is apparent in this example.

Based on the material that was developed above, a solution for the robust super-resolution problem will be provided. Combining the ideas presented thus far, the robust solution of the super-resolution problem is presented as follows $$\hat{X} = \underset{X}{\text{ArgMin}} \left[ \sum_{k=1}^{N} \|D(k)H(k)F(k)\underline{X} - \underline{Y}(k)\|_1 + \lambda \sum_{l,m=-P}^{P} \alpha^{|m|+|l|} \|\underline{X} - S_x^l S_y^m \underline{X}\|_1 \right]$$

The steepest descent is used to find the solution to this minimization problem $$\hat{\underline{X}}_{n+1} = \hat{\underline{X}}_n - \beta \left\{ \sum_{k=1}^{N} F^T(k)H^T(k)D^T(k)\text{sign}(D(k)H(k)F(k)\hat{\underline{X}}_n - \underline{Y}(k)) + \lambda \sum_{l,m=-P}^{P} \alpha^{|m|+|l|}[I - S_y^{-m} S_x^{-l}]\text{sign}(\hat{\underline{X}}_n - S_x^l S_y^m \hat{\underline{X}}_n) \right\}$$

where $\beta$ is a scalar defining the step size in the direction of the gradient. $S_x^{-l}$ and $S_y^{-m}$ define the transposes of matrices $S_x^l$ and $S_y^m$ respectively and have a shifting effect in the opposite directions as $S_x^l$ and $S_y^m$.

Simulation results presented below will show the strength of the algorithm in the current invention. The matrices F, H, D, S, and their transposes can be exactly interpreted as direct image operators such as shift, blur, and decimation. Noting and implementing the effects of these matrices as a sequence of operators alleviates the need to explicitly construct them as matrices. This property helps the method of the current invention to be implemented in an extremely fast and memory efficient way.

Figure 6:
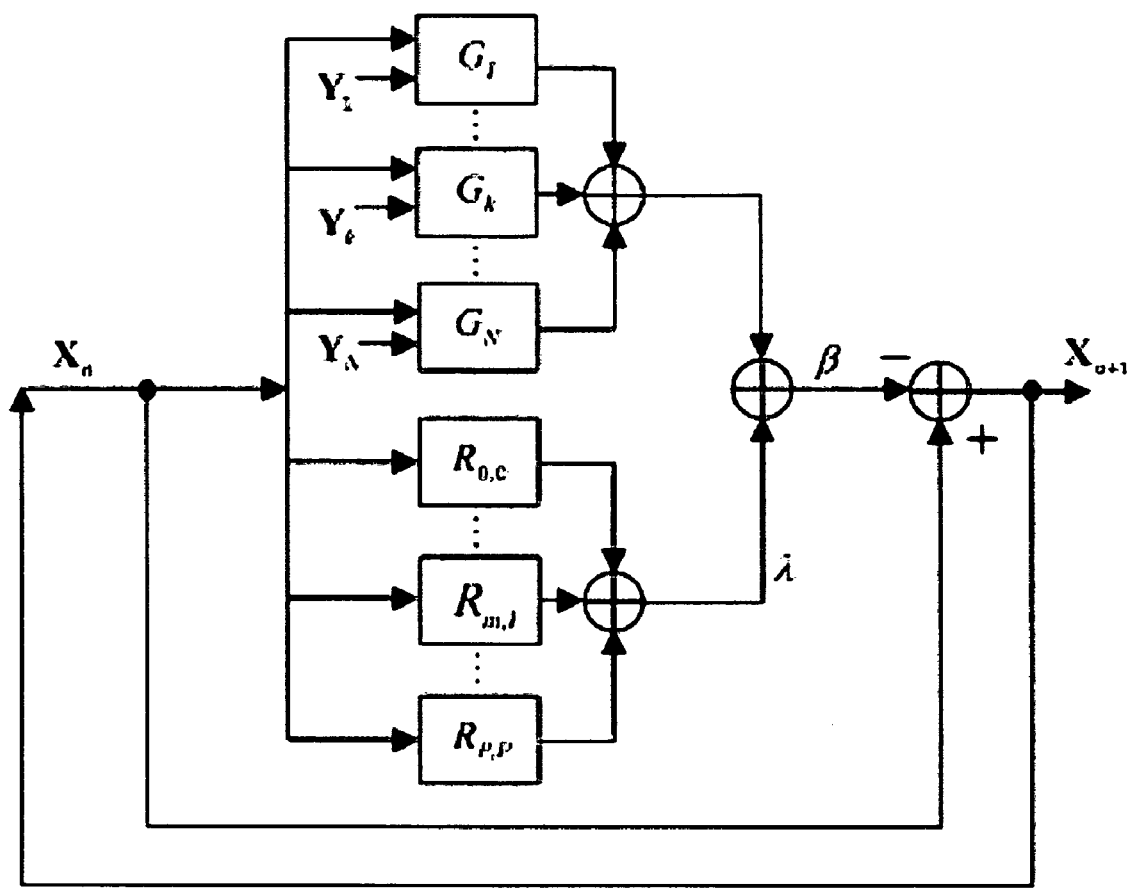
FIG. 6 shows an extended block diagram representation of $G_k$ and $R_{m,l}$.

FIG. 6 is a block diagram representation of $$\hat{\underline{X}}_{n+1} = \hat{\underline{X}}_n - \beta \left\{ \sum_{k=1}^{N} F^T(k)H^T(k)D^T(k)\text{sign}(D(k)H(k)F(k)\hat{\underline{X}}_n - \underline{Y}(k)) + \lambda \sum_{l,m=-P}^{P} \alpha^{|m|+|l|}[I - S_y^{-m} S_x^{-l}]\text{sign}(\hat{\underline{X}}_n - S_x^l S_y^m \hat{\underline{X}}_n) \right\}.$$

There, each LR measurement $Y_k$ will be compared to the warped, blurred, and decimated current estimate of HR frame $X_n$. Block $G_k$ represents the gradient back projection operator that compares the $k^{th}$ LR image to the estimate of the HR image in the $n^{th}$ steepest descent iteration. Block $R_{m,l}$ represents the gradient of regularization term, where the HR estimate in the $n^{th}$ steepest descent iteration is compared to its shifted version (l pixel shift in horizontal m and pixel shift in vertical directions).

Figure 7:
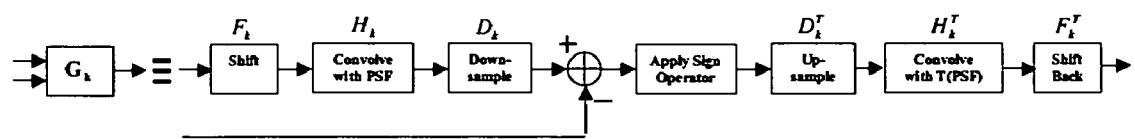
FIGS. 7a-7b show block diagram representations of similarity of cost derivative ($G_k$), and regularization cost derivative, respectively.
Figure 7:
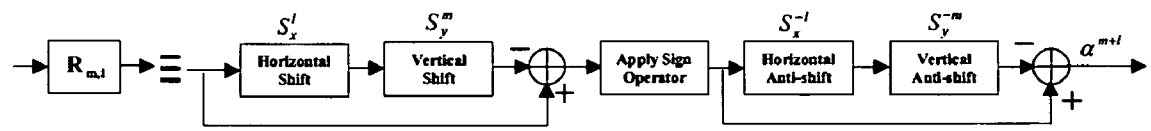

Details of the blocks $G_k$ and $R_{m,l}$ are defined in FIG. 7(a) and FIG. 7(b). Block T(PSF) in FIG. 7(a) replaces the matrix $H_k^T$ with a simple convolution. Function T flips the columns of PSF kernel in the left-right direction (that is, about the vertical axis), and then flips the rows of PSF kernel in the up-down direction (that is, about the horizontal axis). If the PSF kernel has even dimensions, one extra row or column of zeros will be added to it to make it odd size (zero columns and rows have no effect in convolution process). The up-sampling block in FIG. 7(a) can be easily implemented by filling r−1 zeros both in vertical and horizontal directions around each pixel (FIG. 3). And, finally, the $F_k^T$ shift-back block in FIG. 7(a), is implemented by inverting the translational motion in the reverse direction. Note that even for the more general affine motion model a similar inverting property (though more complicated) is still valid.

Parallel processing potential of this method, which significantly increases the overall speed of implementation, can be easily interpreted from FIG. 6 (the computation of each $G_k$ or $R_{l,m}$ blocks may be assigned to a separate processor).

The robust super-resolution approach of the current invention also has an advantage in the computational aspects over other methods. In the method of the current invention, an inherently robust cost function has been presented, for which a number of computationally efficient numerical minimization methods (such as conjugate gradient (CG), preconditioned conjugate gradient (PCG), Jacobi, and many others) are applicable. On the contrary, a steepest descent method has been used in prior art to minimize the nonrobust $L_2$ norm cost function, and robustness is achieved by modifying the steepest descent method, where median operator is used in place of summation operator in computing the gradient term of $$\underline{G}_2 = \sum_{k=1}^{N} F_k^T D^T \left( DF_k \hat{\underline{Z}}_n - \underline{Y}_k \right) = \underline{0}.$$

Implementing the same scheme of substituting summation operator with median operator in computationally more efficient methods such as conjugate gradient is not a straightforward task and besides it is no longer guaranteed that the modified steepest descent and conjugate gradient minimization converge to the same answer.

Figure 8:
FIGS. 8a-8b show reconstruction of outlier contaminated image FIG. 2.
Figure 8:

As an example, FIG. 8(a) and FIG. 8(b) show the result of implementing the proposed method on the same image sets that was used to generate FIG. 2(d) and FIG. 2(f), respectively. The outlier effects have been reduced significantly (more detailed examples are presented below).

An alternate method is presented to achieve further improvements in computational efficiency. As presented above, an iterative robust super-resolution method was provided based on $$\hat{X}_{n+1} = \hat{X}_n - \beta \left\{ \sum_{k=1}^{N} F_k^T H_k^T D_k^T \text{sign} \left( D_k H_k F_k \hat{X}_n - Y_k \right) + \lambda \sum_{l,m=-P}^{P} \alpha^{|m|+|l|} [I - S_y^{-m} S_x^{-l}] \text{sign} \left( \hat{X}_n - S_x^l S_y^m \hat{X}_n \right) \right\}.$$

Although implementation of this minimization solution found by using steepest descent is very fast, for real-time image sequence processing, faster methods are always desirable. Here, based on the interpretation of $$G_1 = \sum_{k=1}^{N} F_k^T D^T \text{sign} \left( DF_k \hat{Z} - Y_k \right) = \underline{0}.$$

that was offered above, the minimization solution found by using steepest descent is simplified to achieve a faster method. In this method, resolution enhancement is broken into two consecutive steps:

1) noniterative data fusion;
2) iterative deblurring-interpolation.

As was described, registration followed by the median operation (referred to as median shift and add) results in $\hat{Z}=H\hat{X}$.

The goal of the deblurring-interpolation step is finding the deblurred HR frame $\hat{X}$. Note that for the under-determined cases, not all $\hat{Z}$ pixel values can be defined in the data fusion step, and their values should be defined in a separate interpolation step. In the current discussion, interpolation and deblurring are done simultaneously.

The following expression formulates our minimization criterion for obtaining $\hat{X}$ from $\hat{Z}$ $$\hat{X} = \underset{X}{\text{ArgMin}} \left[ \| \Phi(H\underline{X} - \hat{Z}) \|_1 + \lambda' \sum_{l,m=-P}^{P} \alpha^{|m|+|l|} \| X - S_x^l S_y^m X \|_1 \right]$$

where matrix $\Phi$ is a diagonal matrix with diagonal values equal to the square root of the number of measurements that contributed to make each element of $\hat{Z}$ (in the square case $\Phi$ is the identity matrix). So, the undefined pixels of have no effect on the HR estimate. On the other hand, those pixels of $\hat{Z}$ which have been produced from numerous measurements, have a stronger effect in the estimation of the HR frame $\hat{X}$.

As $\Phi$ is a diagonal matrix, $\Phi^T = \Phi$, and the corresponding steepest descent solution of minimization problem for obtaining $\hat{X}$ from $\hat{Z}$ above can be expressed as $$\hat{X}_{n+1} = \hat{X}_n - \beta \left\{ H^T \Phi^T \text{sign} \left( H\hat{X}_n - \hat{Z} \right) + \lambda' \sum_{l,m=-P}^{P} \alpha^{|m|+|l|} [I - S_y^{-m} S_x^{-l}] \text{sign} \left( \hat{X}_n - S_x^l S_y^m \hat{X}_n \right) \right\}.$$

Decimation and warping matrices (D and F) and summation of measurements are not present anymore, which makes the implementation of this steepest descent solution much faster than the former solution. Note that physical construction of matrix $\Phi$ is not necessary as it can be implemented as a mask matrix with the size equal to image X.

Figure 9:
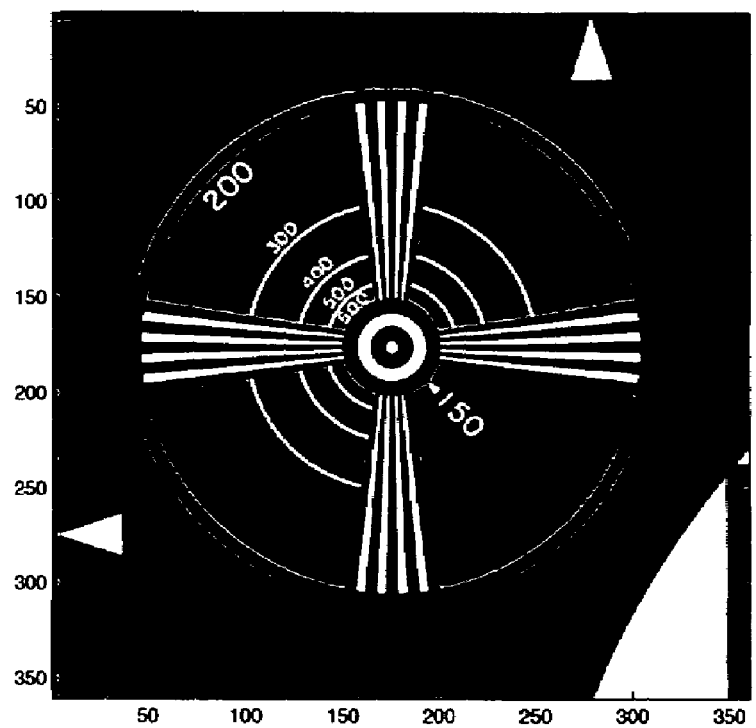
FIGS. 9a-9h show simulation results of different resolution enhancement methods.
Figure 9:
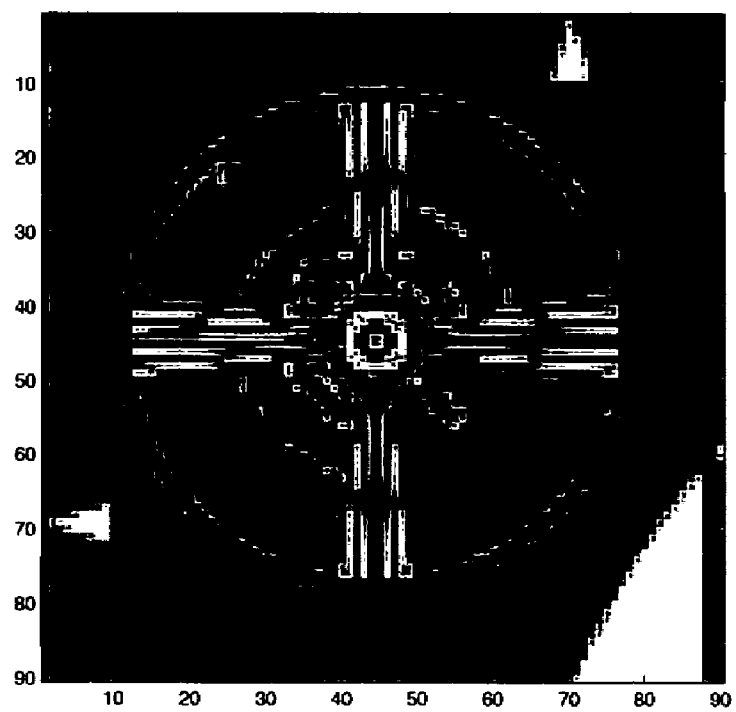
Figure 9:
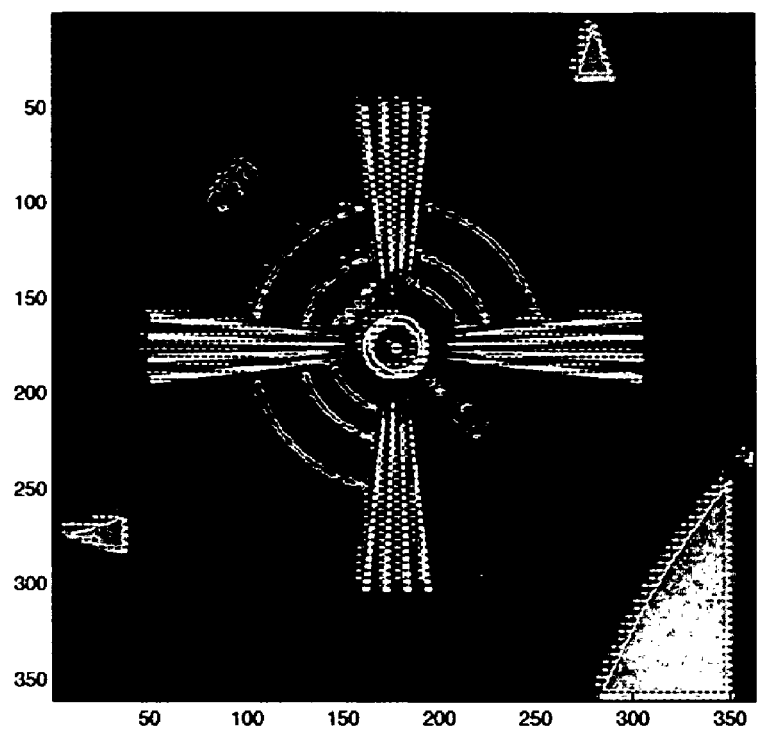
Figure 9:
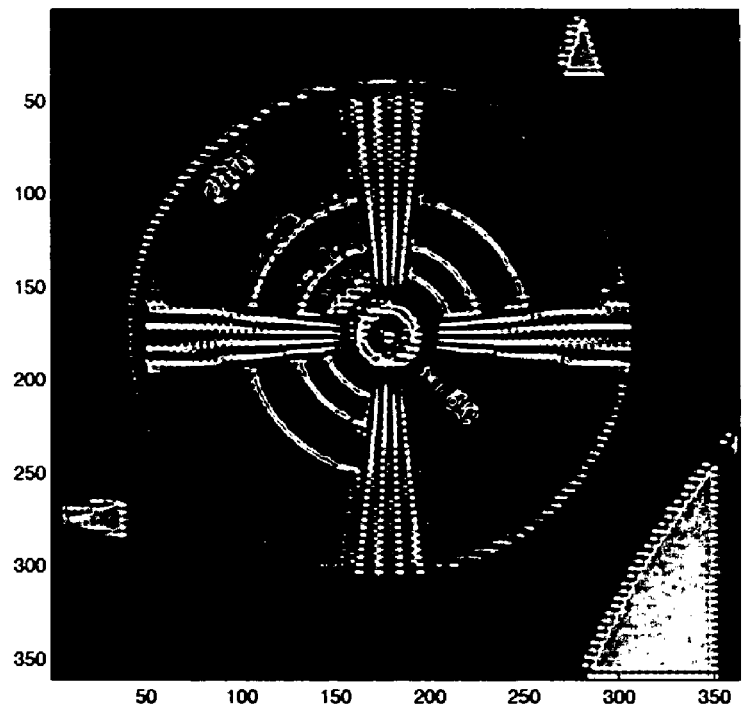
Figure 9:
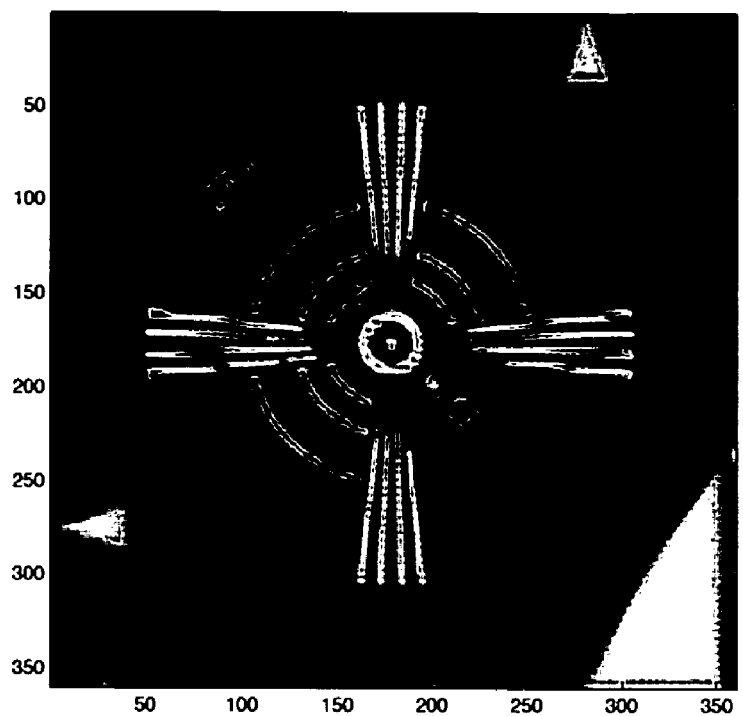
Figure 9:
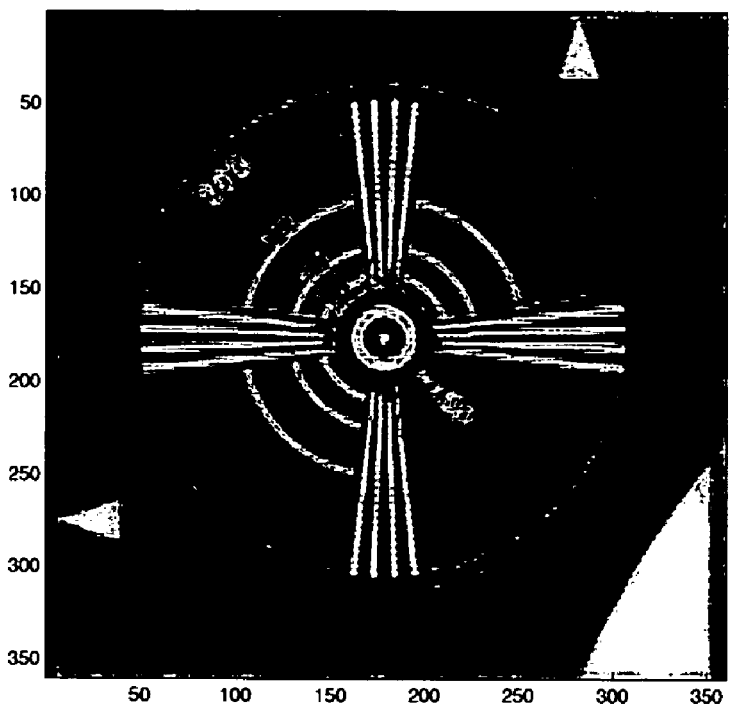
Figure 9:
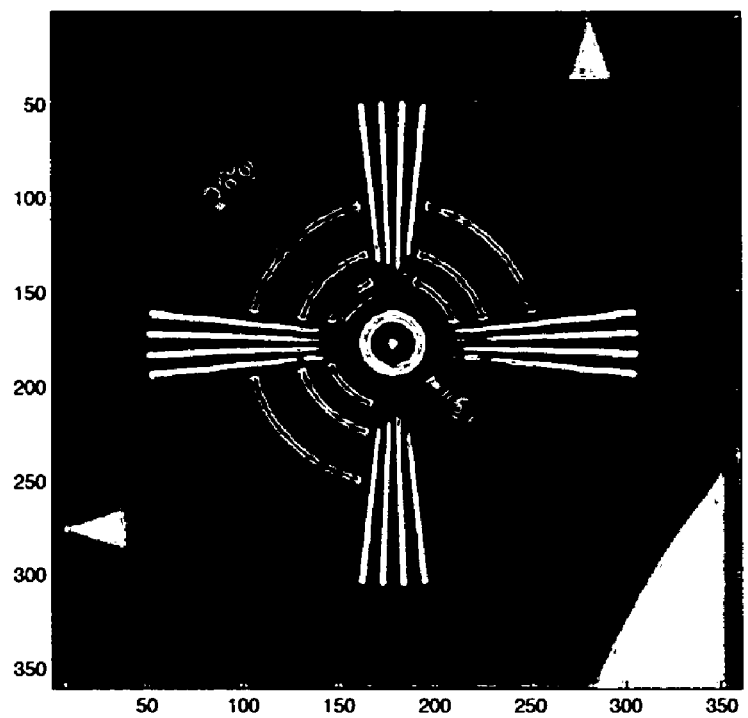
Figure 9:
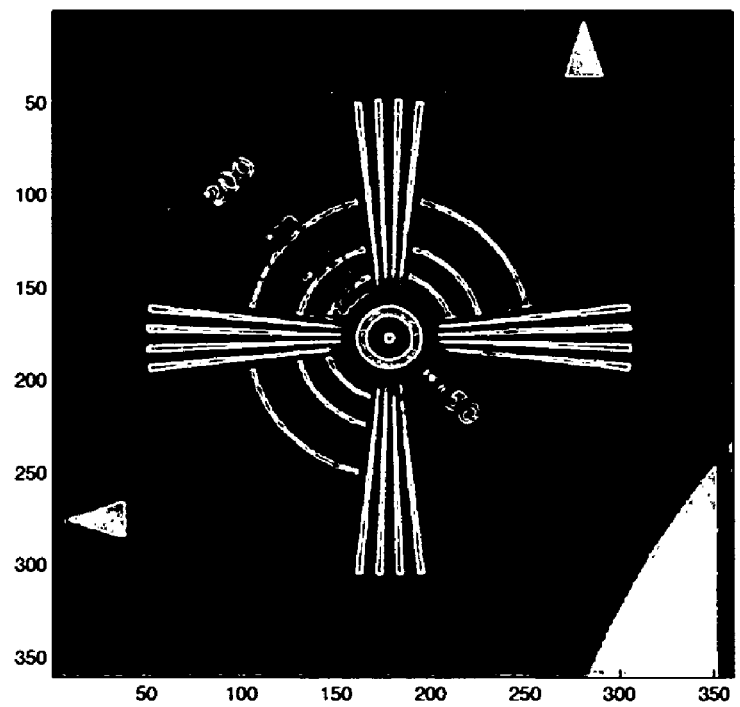
Figure 9:
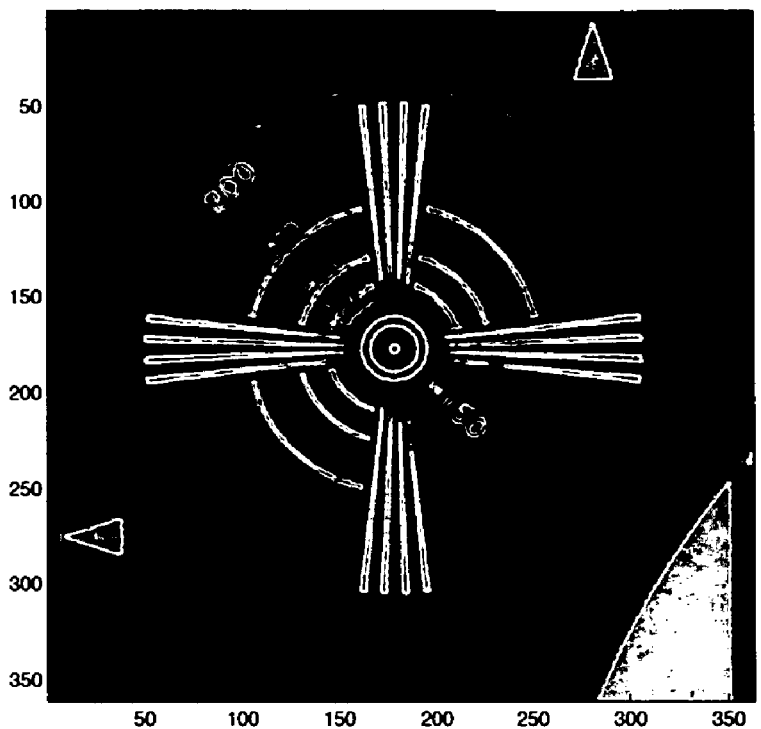

The performance of the resolution enhancement algorithms presented are compared to existing resolution enhancement methods in the following experiments. The first example is a controlled simulated experiment. FIGS. 9(a)-9(i) show simulation results of different resolution enhancement methods applied to the original HR frame of FIG. 9(a). FIG. 9(b) is a LR frame. FIG. 9(c) is a Shift and add result. FIG. 9(d) is a Deconvolved shift and add result. FIG. 9(e) is the $L_2$+Tikhonov result. FIG. 9(f) is the Zomet method. FIG. 9(g) is the Zomet method with regularization. FIG. 9(h) is the $L_1$+bilateral TV. FIG. 9(i) is the median shift and add +bilateral TV. In this experiment, a sequence is created of LR frames by using one HR image [FIG. 9(a)]. First, this HR image is shifted by a pixel in the vertical direction. Then, to simulate the effect of camera PSF, this shifted image was convolved with a symmetric Gaussian low-pass filter of size 4×4 with standard deviation equal to one. The resulting image was subsampled by the factor of 4 in each direction. The same approach with different motion vectors (shifts) in vertical and horizontal directions was used to produce 16 LR images from the original scene. Gaussian noise was added to the resulting LR frames to achieve signal-to-noise ratio (SNR) equal to 18 dB. SNR is defined as 10 log ($\sigma^2/\sigma_n^2$), where $\sigma^o{}_n{}^2$, or 2 are variance of a clean frame and noise, respectively. One of these LR frames is presented in FIG. 9(b). To simulate the errors in motion estimation, a bias equal to one pixel shift in the LR grid was intentionally added to the known motion vectors of three LR frames.

The result of implementing the noniterative resolution enhancement method is shown in FIG. 9(c). It is not surprising to see the motion error artifacts in the HR frame as the HR image is the result of zero filling, shifting, and adding the LR measurements. Deblurring this result a Wiener method [FIG. 9(d)] does not remove these artifacts. For reference, FIG. 9(e) shows the result of applying an iterative method based on minimizing $L_2$ norm, both for the residual and the regularization terms. The following equation describes this minimization criterion:

$$\hat{X} = \text{ArgMin} \left[ \sum_{k=1}^{N} \| D_k H_k F_k X - Y_k \|_2^2 + \lambda \| \Gamma X \|_2^2 \right]$$

in which $\Gamma$ is defined in $$\Gamma_{kernel} = \frac{1}{8}\begin{bmatrix} 1 & 1 & 1 \\ 1 & -8 & 1 \\ 1 & 1 & 1 \end{bmatrix}$$

and regularization factor λ was chosen to be 0.4. As $L_2$ norm is not robust to motion error, motion artifacts are still visible in the result. Note that the relatively high regularization factor which was chosen to reduce the motion artifact has resulted in a blurry image.

The robust super-resolution method known in the art resulted in FIG. 9(f). FIG. 9(g) was obtained by simply adding the regularization term defined in $$\hat{X} = \text{ArgMin}\left[\sum_{k=1}^{N} \|D_k H_k F_k \underline{X} - \underline{Y}_k\|_2^2 + \lambda \|\Gamma \underline{X}\|_2^2\right]$$

to the method of FIG. 9(f) which is far better than the $L_2$ approach, yet exhibiting some artifacts. FIG. 9(h) shows the implementation of the robust superresolution method of the current invention described above. The selected parameters for this method were as follows: λ=0.005, P=2, β=110, and α=0.6. FIG. 9(i) shows the implementation of the fast robust superresolution method according to the current invention. The selected parameters for this method were as follows: λ'=0.08, P=2, β=1, and α=0.6. Comparing FIG. 9(h) and FIG. 9(i) to other methods, it is apparent that not only the method of the current invention has removed the outliers more efficiently, but also it has resulted in sharper edges without any ringing effects.

Figure 10:
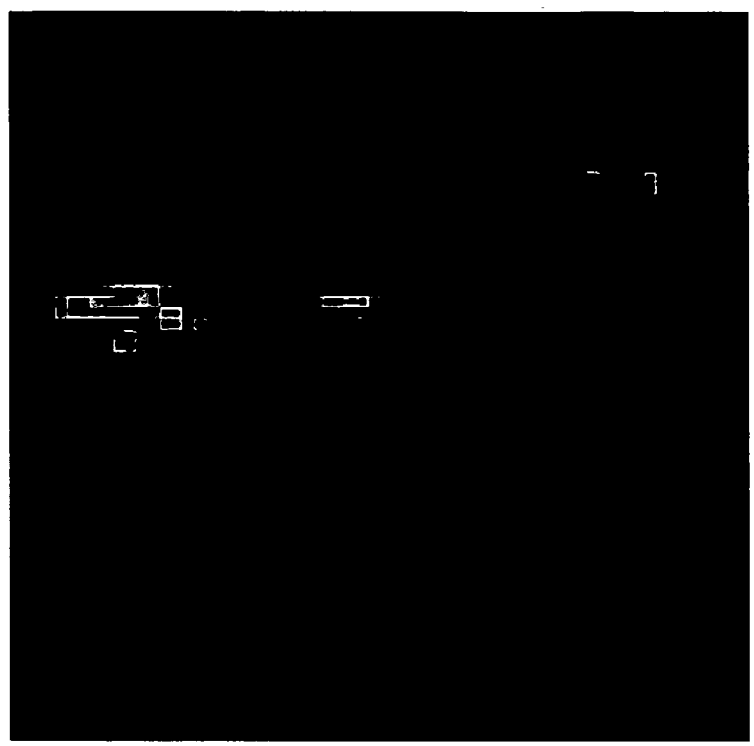
FIGS. 10a-10d show the results of different resolution enhancement methods applied to a Tank sequence.
Figure 10:
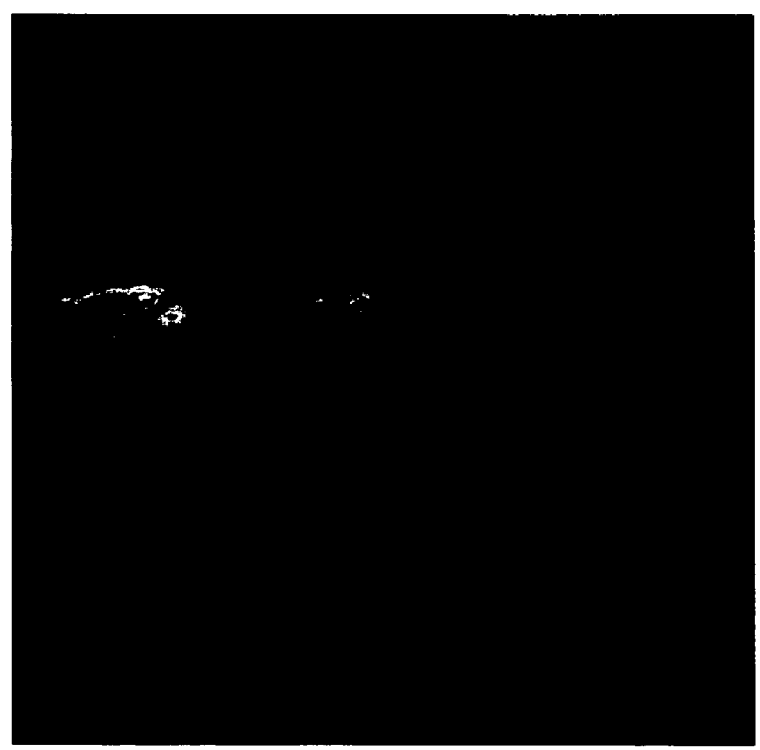
Figure 10:
Figure 10:

A second example is a real infrared camera image sequences with no known outliers, courtesy of B. Yasuda and the FLIR research group in the Sensors Technology Branch, Wright Laboratory, WPAFB, Ohio. FIGS. 10(a)-10(d) show results of different resolution enhancement methods applied to a Tank sequence. Eight LR frames were used in this reconstruction to get resolution enhancement factor of four [FIG. 10(a) shows one of the input LR images]. Note that this is an under-determined scenario. FIG. 10(b) shows the cubic spline interpolation of FIG. 10(a) by factor of four. The (unknown) camera PSF was assumed to be a 4×4 Gaussian kernel with standard deviation equal to one. A method known in the art was used to computed the motion vectors. $L_2$ norm reconstruction with Tikhonov regularization $$\hat{X} = \text{ArgMin}\left[\sum_{k=1}^{N} \|D_k H_k F_k \underline{X} - \underline{Y}_k\|_2^2 + \lambda \|\Gamma \underline{X}\|_2^2\right]$$

result is shown in FIG. 10(c) where F is defined in $$\Gamma_{kernel} = \frac{1}{8}\begin{bmatrix} 1 & 1 & 1 \\ 1 & -8 & 1 \\ 1 & 1 & 1 \end{bmatrix}$$

and regularization factor λ was chosen to be 0.1. FIG. 10(d) shows the implementation of $$\hat{X}_{n+1} = \hat{X}_n - \beta\left\{\begin{array}{l}\sum_{k=1}^{N} F_k^T H_k^T D_k^T \text{sign}(D_k H_k F_k \hat{X}_n - \underline{Y}_k) + \\ \lambda \sum_{l,m=-P}^{P} \alpha^{|m|+|l|}[I - S_y^{-m} S_x^{-l}] \text{sign}(\hat{X}_n - S_x^l S_y^m \hat{X}_n)\end{array}\right\}$$

with the following parameters λ=0.006, P=2, β=81, and α=0.5. Although modeling noise in these frames as additive Gaussian is a reasonable assumption, the method of the current invention achieved a better result than the best norm minimization.

Figure 11:
FIGS. 11a-11d show the results of different resolution enhancement methods applied to ADYORON test sequence.
Figure 11:
Figure 11:
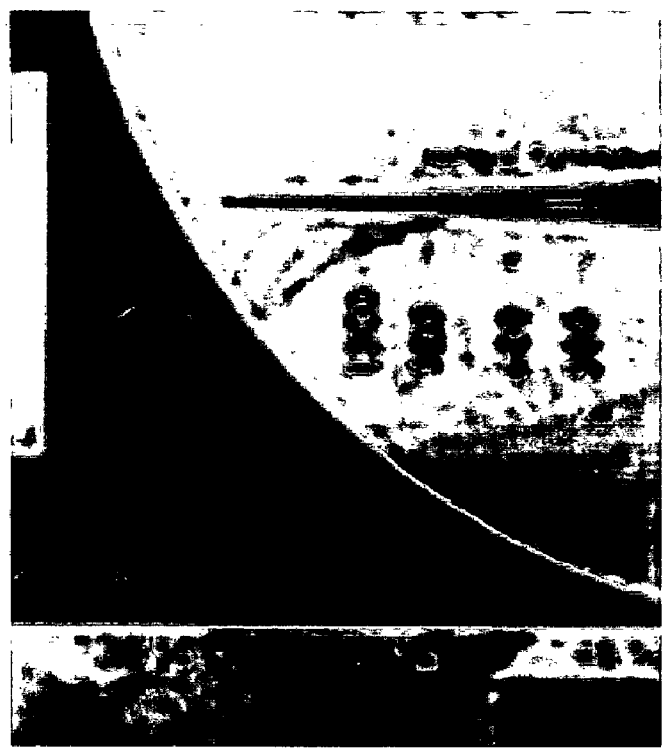
Figure 11:
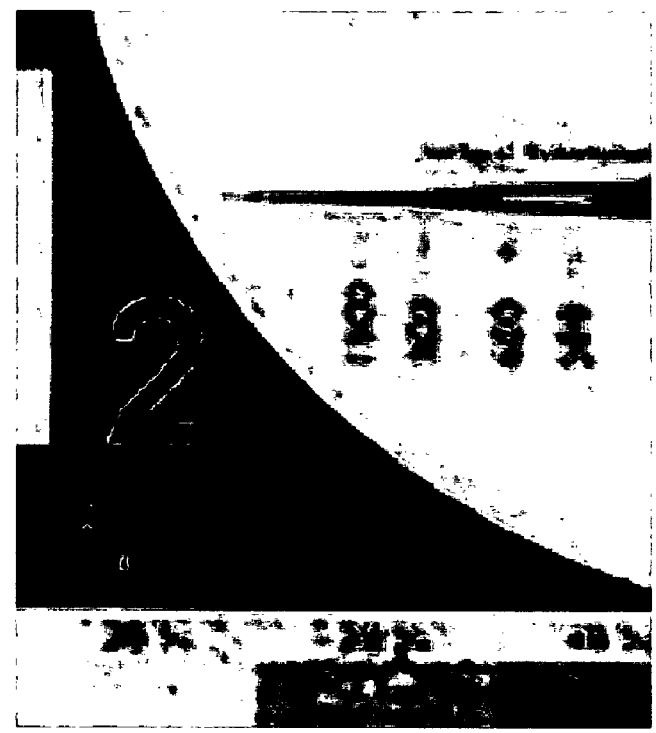

A third experiment is a real compressed sequence of 20 images (containing translational motion) from a commercial video camera; courtesy of Adyoron Intelligent Systems, Ltd., Tel Aviv, Israel. FIG. 11(a) is one of these LR images and FIG. 11(b) is the cubic spline interpolation of this image by factor of three.

Five frames were intentionally rotated of this sequence (rotation from 20° to 60°) out of position, creating a sequence of images with relative affine motion. The (unknown) camera PSF was assumed to be a 5×5 Gaussian kernel with standard deviation equal to two. A Known method was used to computed the motion vectors with translational motion assumption. The error in motion modeling results in apparent shadows in $L_2$ norm reconstruction with Tikhonov regularization [FIG. 11(c)] where Γ is defined in $$\Gamma_{kernel} = \frac{1}{8}\begin{bmatrix} 1 & 1 & 1 \\ 1 & -8 & 1 \\ 1 & 1 & 1 \end{bmatrix}$$

and regularization factor λ was chosen to be 0.5. These shadows are removed in FIG. 11(d), where the method described above $$\hat{X}_{n+1} = \hat{X}_n - \beta\left\{\begin{array}{l}\sum_{k=1}^{N} F_k^T H_k^T D_k^T \text{sign}(D_k H_k F_k \hat{X}_n - \underline{Y}_k) + \\ \lambda \sum_{l,m=-P}^{P} \alpha^{|m|+|l|}[I - S_y^{-m} S_x^{-l}] \text{sign}(\hat{X}_n - S_x^l S_y^m \hat{X}_n)\end{array}\right\}$$

was used for reconstruction with the following parameters λ=0.003, P=2, β=50, and α=0.7.

Figure 12:
FIGS. 12a-12j show the results of different resolution methods applied to the Alpaca sequence.
Figure 12:
Figure 12:
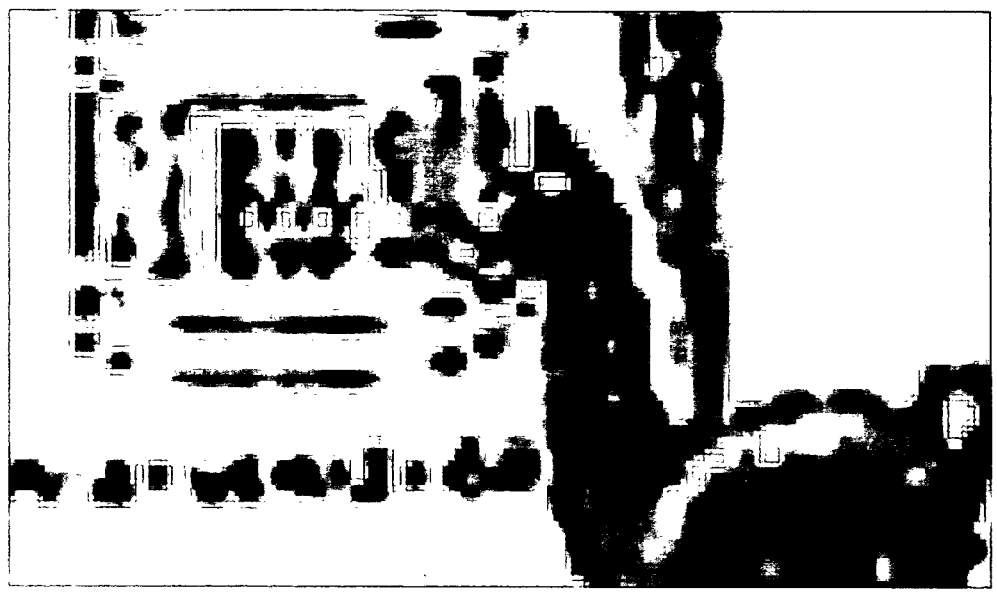
Figure 12:
Figure 12:
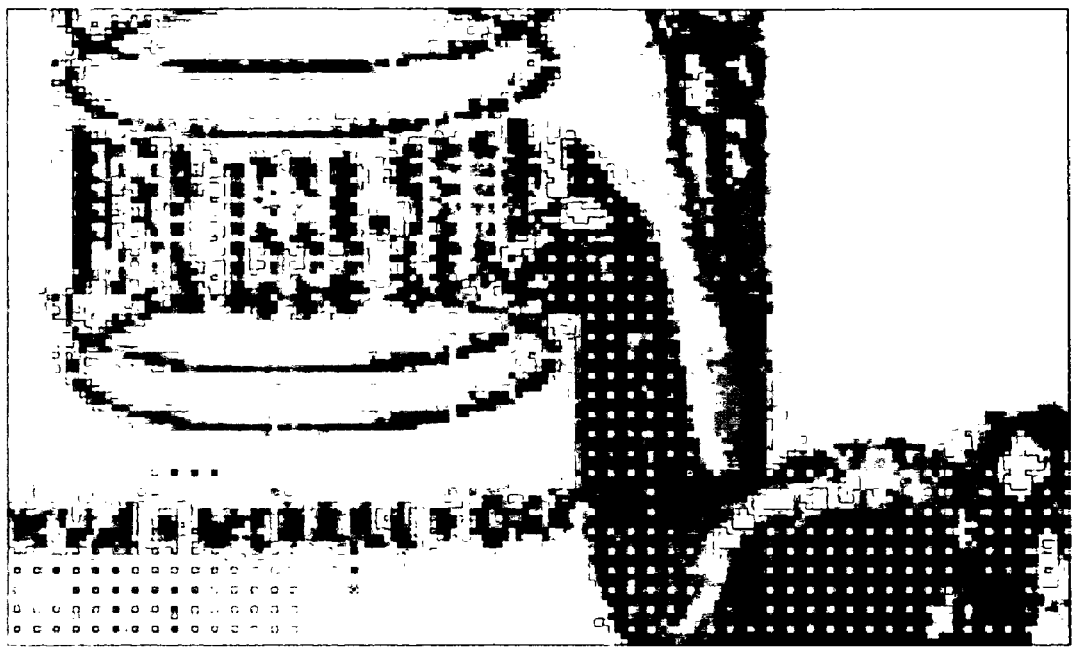
Figure 12:
Figure 12:
Figure 12:
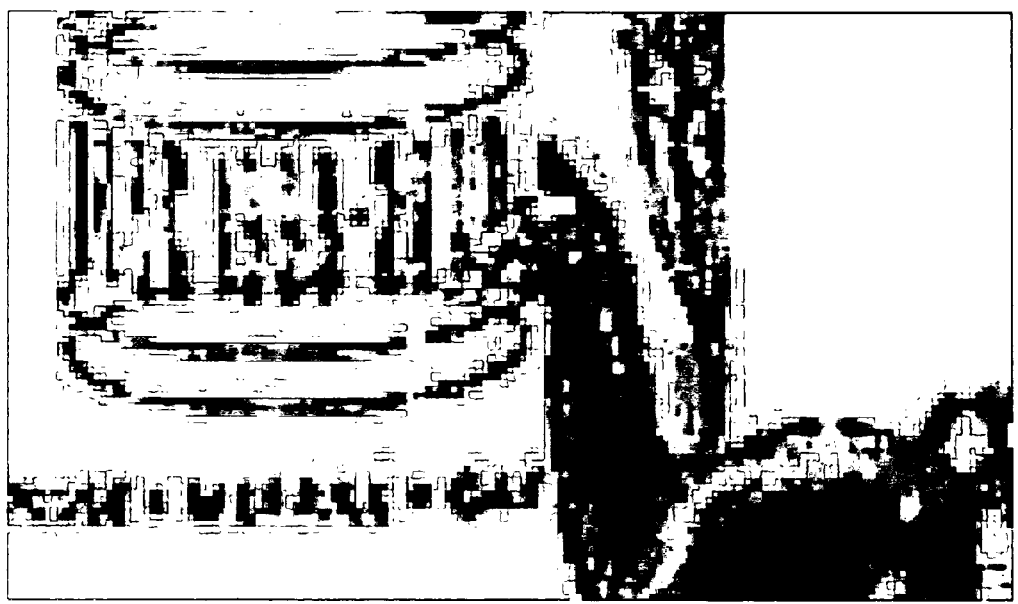
Figure 12:
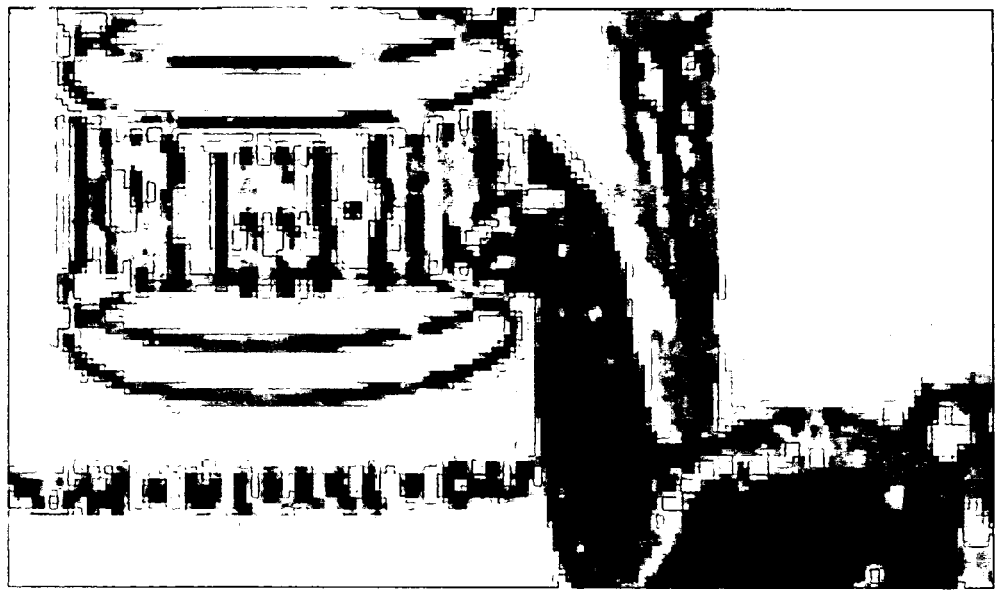
Figure 12:

A final experiment is a factor of three resolution enhancement of a real compressed image sequence captured with a commercial webcam (3Com, Model no. 3718). The (unknown) camera PSF was assumed to be a 3×3 Gaussian kernel with standard deviation equal to 1. In this sequence, two separate sources of motion were present. First, by shaking the camera a global motion was created for each individual frame. Second, an Alpaca statue was independently moved in ten frames out of total 55 input frames. One of the LR input images is shown in FIG. 12(a). Cubic spline interpolation of FIG. 12(a) by factor of three is shown in FIG. 12(b). FIG. 12(c) and FIG. 12(d) are the shift and add results using mean and median operators [minimizing $\hat{Z}$ in $$\hat{Z} = \text{ArgMin}_{Z}\left[\sum_{k=1}^{N}\|DF_kZ - Y_k\|_p^p\right]$$

with p =2 and p =1, respectively]. Note that the median operator has lessened the (shadow) artifacts resulting from the Alpaca motion. $L_2$ norm reconstruction with Tikhonov regularization $$\hat{X} = \text{ArgMin}\left[\sum_{k=1}^{N}\|D_kH_kF_kX - Y_k\|_2^2 + \lambda\|\Gamma X\|_2^2\right]$$

result is shown in FIG. 12(*e*), where $\Gamma$ is defined in $$\Gamma_{kernel} = \frac{1}{8}\begin{bmatrix} 1 & 1 & 1 \\ 1 & -8 & 1 \\ 1 & 1 & 1 \end{bmatrix}$$

and regularization factor $\lambda$ was chosen to be one. FIG. 12(*f*) is the result of minimizing the cost function (as shown at the bottom of the page), where $L_2$ is the norm minimization of data error term is combined with bilateral TV regularization with the following parameters $\lambda$=0.1, P=2, $\alpha$=0.7 and $\beta$=70 (steepest descent step size). Note that the artifacts resulting from the motion of Alpaca statue is visible in FIG. 12(*d*)-12(*g*). A robust super-resolution method of the current invention is shown in FIG. 12(*h*). Implementation of the method described earlier $$\hat{X}_{n+1} = \hat{X}_n - \beta\left\{\begin{array}{l}\sum_{k=1}^{N}F_k^TH_k^TD_k^T\text{sign}(D_kH_kF_k\hat{X}_n - Y_k) + \\ \lambda\sum_{l,m=-P}^{P}\alpha^{|m|+|l|}[I - S_y^{-m}S_x^{-l}]\text{sign}(\hat{X}_n - S_x^lS_y^m\hat{X}_n)\end{array}\right\}$$

with the following parameters $\lambda$=0.003, P=2, $\beta$=30, and $\alpha$=0.7 resulted in FIG. 12(*i*), with the least outlier effect. And, finally, implementation of the fast method of the current invention described earlier $$\hat{X}_{n+1} = \hat{X}_n - \beta\left\{\begin{array}{l}H^T\Phi^T\text{sign}(H\hat{X}_n - \hat{Z}) + \\ \lambda'\sum_{l,m=-P}^{P}\alpha^{|m|+|l|}[I - S_y^{-m}S_x^{-l}]\text{sign}(\hat{X}_n - S_x^lS_y^m\hat{X}_n)\end{array}\right\}.$$

with the following parameters $\lambda'$=0.04, P=2, $\beta$=1, and $\alpha$=0.7 resulted in FIG. 12(*j*), which is very similar to the result in FIG. 12(*i*).

An algorithm is provided to enhance the quality of a set of noisy blurred images and produce a high-resolution (HR) image with less noise and blur effects. Presented is a robust super-resolution method based on the use of $L_1$ norm both in the regularization and the measurement terms of our penalty function. A method is shown that removes outliers efficiently, resulting in images with sharp edges. Even for images in which the noise followed the Gaussian model, $L_1$ norm minimization results were as good as $L_2$ norm minimization results, which encourages using $L_1$ norm minimization for any data set. The method of the current invention is fast and easy to implement.

Further presented and mathematically justified is a very fast method based on pixelwise "shift and add" and related it to $L_1$ norm minimization when relative motion is pure translational, and PSF and decimation factor is common and space invariant in all low-resolution (LR) images. Note that the mathematical derivation of the shift and add method is independent of the constraint over decimation factor, but it is included as this constraint distinguishes super-resolution problem from the more general problem of multiscale image fusion. In this method, the displacements in the HR grid are rounded so that $F_k$ applies only integer translations. This does not pose a problem as the rounding is done only on the HR grid. Any alternative method will introduce time consuming smoothing interpolation effects which can be harder to overcome.

Analysis of the convergence properties of the steepest descent method is only possible for simplistic cases such as minimizing a quadratic function. Considering quantized images, $L_1$ norm minimization, and regularization terms make such analysis much harder. Only five to twenty iterations are required for convergence to the desired solution, where the initialization and the type of involved images play a vital role in determining the required iterations. The outcome of a speed-up method presented below is a very good initialization estimation for the more general case presented below.

Although the "cross validation" method can be used to determine the parameter values, implementing such method for the $L_1$ norm is rather more difficult and computationally expensive. Setting P to 2 or 3 works well; using higher values for will be time consuming while not very useful.

One important extension for the algorithm of the present invention includes incorporation of blur identification algorithms in the super-resolution method. Although many single-frame blind deconvolution algorithms have been suggested in past years and recently incorporated a single-parameter blur identification algorithm in their super-resolution method, still there is need for more research to provide a super-resolution method along with a more general blur estimation algorithm.

Little work has been done for resolution enhancement of compressed video sequences. Compression artifacts resulting from quantization of discrete cosine transform (DCT) coefficients can dramatically decrease the performance of super-resolution system. The results presented may be used to design a very fast none iterative method for reducing the compression artifacts in the super-resolved images.

One of the most apparent effects of DCT-based compression methods, such as MPEG for video and JPEG for still images, is the blocking artifact. The quantization noise variance of each pixel in a block is space variant. For a block located in a low-frequency content area, pixels near boundaries contain more quantization noise than the interior pixels. On the other hand, for the blocks located in the high-frequency area, pixels near boundaries contain less quantization noise than the interior pixels. This space-variant noise property of the blocks may be exploited to reduce the quantization noise. Because of the presence of motion in video sequences, pixel locations in the blocks change from one frame to the other. So two corresponding pixels from two different frames may be located on and off the boundaries of the blocks in which they are located. Based on the discussion presented, it is easy to determine which pixel has less quantization noise.

It is reasonable to assign a higher weight to those pixels which suffer less from quantization noise in the data fusion step which was explained above. The relative magnitude of the weight assigned because of quantization and the weight that was explained will depend on the compression ratio.

The present invention has now been described in accordance with several exemplary embodiments, which are intended to be illustrative in all aspects, rather than restrictive.

What is claimed is:

1. A method of creating a super-resolved grayscale image from a plurality of lower-resolution images, the method comprising:
   a. providing a computer for manipulating data;
   b. providing at least two low-resolution images, wherein said low-resolution image comprises low-resolution data;
   c. using a data fidelity penalty term in said manipulation, wherein said data fidelity penalty term is an $L_1$ norm penalty term to enforce similarities between said low-resolution data and a high-resolution image estimate; and
   d. using a spatial penalty term, wherein said spatial penalty term is a penalty term to encourage sharp edges in said high-resolution image; whereby said super-resolved grayscale image is provided.

2. The method according to claim 1, wherein said data fidelity penalty term is applied to space invariant point spread function, translational, affine, projective and dense motion models wherein said data fidelity penalty term comprises the steps of:
   a. fusing said lower-resolution images to estimate a blurred higher-resolution image; and
   b. estimating a deblurred image from said blurred higher-resolution image, wherein said blurred higher-resolution image is a weighted mean of all measurements of a given pixel after zero filling and motion compensation.

3. The method according to claim 1, wherein said data fidelity penalty term uses motion estimation errors comprising said $L_1$ norm in a likelihood fidelity term.

4. The method according to claim 1, wherein said spatial penalty term uses bilateral-TV regularization.

5. The bilateral-TV regularization of claim 4 comprises an image having a horizontal pixel-shift term, a vertical pixel-shift term, and a scalar weight between 0 and 1.

6. The method according to claim 1, wherein combining said data fidelity penalty term, said spatial penalty term, create an overall cost function.

7. The overall cost function of claim 6, wherein a steepest descent optimization is applied to said overall cost function for minimization.

8. The method according to claim 1, wherein direct image operator effects comprising blur, high-pass filtering, masking, down-sampling, and shift are implemented in place of matrices for process speed and memory efficiency.

9. The method according to claim 1, wherein said lower-resolution images comprised compressed images and uncompressed images.

10. The method according to claim 1, wherein said method is a computer implemented method.

* * * * *